(12) United States Patent
Kumar et al.

(10) Patent No.: US 7,849,221 B2
(45) Date of Patent: Dec. 7, 2010

(54) ONLINE INSTANCE DELETION IN A MULTI-INSTANCE COMPUTER SYSTEM

(75) Inventors: Raj Kumar, Brooklyn, NY (US); Jonathan Creighton, Oakland, CA (US); Alok K. Srivastava, Newark, CA (US)

(73) Assignee: Oracle International Corporation, Redwood Shores, CA (US)

( * ) Notice: Subject to any disclaimer, the term of this patent is extended or adjusted under 35 U.S.C. 154(b) by 379 days.

(21) Appl. No.: 11/711,241

(22) Filed: Feb. 26, 2007

(65) Prior Publication Data

US 2007/0234292 A1    Oct. 4, 2007

Related U.S. Application Data

(62) Division of application No. 09/945,118, filed on Aug. 31, 2001, now Pat. No. 7,203,700.

(51) Int. Cl.
G06F 15/16 (2006.01)
G06F 7/00 (2006.01)

(52) U.S. Cl. .................... 709/248; 707/608; 707/609; 707/692

(58) Field of Classification Search ................. 709/248; 707/608, 609, 692
See application file for complete search history.

(56) References Cited

U.S. PATENT DOCUMENTS

| | | | |
|---|---|---|---|
| 5,341,478 A | 8/1994 | Travis et al. | |
| 5,421,012 A | 5/1995 | Khoyi et al. | |
| 5,596,745 A | 1/1997 | Lai et al. | |
| 5,603,031 A | 2/1997 | White et al. | |
| 5,692,183 A | 11/1997 | Hapner et al. | |
| 5,862,325 A * | 1/1999 | Reed et al. | 709/201 |
| 6,070,006 A | 5/2000 | Iriuchijima et al. | |
| 6,185,198 B1 | 2/2001 | LaDue | |
| 6,189,138 B1 | 2/2001 | Fowlow et al. | |
| 6,230,210 B1 * | 5/2001 | Davies et al. | 709/248 |
| 6,230,309 B1 | 5/2001 | Turner et al. | |
| 6,275,828 B1 | 8/2001 | Lee et al. | |
| 6,298,480 B1 | 10/2001 | Beuk et al. | |
| 6,438,616 B1 | 8/2002 | Callsen et al. | |
| 6,523,036 B1 * | 2/2003 | Hickman et al. | 707/10 |
| 6,529,947 B1 | 3/2003 | Feuerman | |
| 6,557,054 B2 | 4/2003 | Reisman | |

(Continued)

OTHER PUBLICATIONS

Notice of Allowance dated Nov. 13, 2006 in U.S. Appl. No. 09/945,118, now U.S. patent 7,203,700.

(Continued)

*Primary Examiner*—Larry Donaghue
*Assistant Examiner*—Asghar Bilgrami
(74) *Attorney, Agent, or Firm*—Silicon Valley Patent Group LLP; Omkar Suryadevara

(57) ABSTRACT

In an application executing in multiple computers connected by a network, an instance of the application is deleted from a group of instances that share a resource, such as a database. Specifically the to-be-deleted instance is shut down, followed by deleting connectivity between the to-be-deleted instance and the network, and then deleting an object of the to-be-deleted instance. Each of these acts is performed automatically without user input, once the user issues an instruction to delete the to-be-deleted instance.

21 Claims, 16 Drawing Sheets

U.S. PATENT DOCUMENTS

| | | | |
|---|---|---|---|
| 6,591,272 | B1 | 7/2003 | Williams |
| 6,640,255 | B1 | 10/2003 | Snyder et al. |
| 6,651,140 | B1 | 11/2003 | Kumar |
| 6,694,506 | B1 | 2/2004 | LeBlanc et al. |
| 6,714,962 | B1 | 3/2004 | Helland et al. |
| 6,789,252 | B1 | 9/2004 | Burke et al. |
| 6,820,267 | B2 | 11/2004 | Christensen et al. |
| 6,826,523 | B1 | 11/2004 | Guy et al. |
| 6,862,617 | B1 | 3/2005 | Wu |
| 6,915,338 | B1 | 7/2005 | Hunt et al. |
| 6,968,538 | B2 | 11/2005 | Rust et al. |
| 7,203,700 | B1 | 4/2007 | Kumar et al. |
| 2003/0115297 | A1 | 6/2003 | Branson et al. |
| 2004/0168174 | A1 | 8/2004 | Baker |

OTHER PUBLICATIONS

Oracle8i Parallel Server Concepts, Release 2 (8.1.6), Dec. 1999, Part No. A76968-01, available from Oracle Corporation, Redwood Shores, California (pp. 3-1 to 3-8, 4-1 to 4-14, 5-1 to 5-34, 6-1 to 6-6, 7-1 to 7-9, and 9-1 to 9-26).
"Adding Additional Nodes to a Cluster" on p. 9-7 of Oracle 8i Parallel Server Setup and Configuration Guide, Release 2 (8.1.6), Dec. 1999, Part No. A76934-01 (pp. 9-1-9-7).
Office Action dated Sep. 13, 2004 U.S. Appl. No. 09/945,118.
Response dated Jan. 12, 2005 in U.S. Appl. No. 09/945,118.
Office Action dated Jun. 14, 2005 in U.S. Appl. No. 09/945,118.
Response dated Sep. 14, 2005 in U.S. Appl. No. 09/945,118.
Office Action dated Dec. 7, 2005 in U.S. Appl. No. 09/945,118.
Amendment dated Mar. 7, 2006 in U.S. Appl. No. 09/945,118.
Office Action dated Jun. 20, 2006 in U.S. Appl. No. 09/945,118.
Response dated Sep. 25, 2006 in U.S. Appl. No. 09/945,118.

* cited by examiner

Oracle Database Configuration Assistant, Step 4 of 7: List of cluster databases Select an active cluster database to delete an instance.

| Select | Database Name | Status |
|--------|---------------|--------|
| ○ | smundo | inactive |
| ○ | aum | inactive |
| ⦿ | ptest | active |
| ○ | compc | inactive |
| ○ | compb | inactive |
| ○ | compa | inactive |
| ○ | sptestb | inactive |

Specify a user with SYSDBA system privilege

User name: system
Password: *******

Cancel  Help  « Back  Next »

*FIG. 16*

ONLINE INSTANCE DELETION IN A MULTI-INSTANCE COMPUTER SYSTEM

CROSS REFERENCE TO PARENT APPLICATION

This application is a divisional application of U.S. application Ser. No. 09/945,118 filed on Aug. 31, 2001 now U.S. Pat. No. 7,203,700 and entitled "ONLINE INSTANCE ADDITION AND DELETION IN A MULTI-INSTANCE COMPUTER SYSTEM" by Raj Kumar et al, which is incorporated by reference herein in its entirety, including appendices A and B.

BACKGROUND

A cluster is a group of independent computers working together as a single system. In a client/server environment, client computers interact with a cluster as though it were a single entity, a single high-performance, highly reliable server. If one computer in a cluster fails, its workload can be automatically distributed among the surviving computers. Computers in a cluster may be used to execute the software instructions of an application (also called "parallel application") in parallel. Examples of parallel applications include database servers, application servers, data mining tools, decision support systems, computer-aided-design tools, gene sequencing tools, seismic (earthquake prediction) tools and modeling tools (e.g. climate, combustion, reservoir, structure, molecules, nuclear). Oracle Parallel Server (OPS) adds parallel technology to the Oracle8i™ database, to enable multiple instances (e.g. Instance1 and Instance2 in FIG. 1) of the database server to execute on computers of a cluster and concurrently access a single shared database that may be resident in an array 5 of disks. Disk storage array 5 provides fault tolerant disk components. Each computer acts as a single node in the configuration. Every computer in a cluster can be connected to a shared array 5 of disks as well as its own local disk 6. All of the computers in the cluster have concurrent read/write access to the data stored on the shared disks. The Oracle Parallel Server (OPS) is described in detail in Oracle8i Parallel Server Concepts, Release 2 (8.1.6), December 1999, Part No. A76968-01, available from Oracle Corporation, Redwood Shores, Calif., and incorporated by reference herein in its entirety.

If one computer in an Oracle™ Parallel Server fails, the other computers still have uninterrupted access to the data stored on the shared disks. The surviving computer(s) automatically perform recovery by rolling back any incomplete transactions that the failed computer was attempting. This ensures the logical consistency of the database. Disk mirroring of the shared disk drives can also be used to minimize the effect of a disk failure. With disk mirroring, a duplicate copy of the contents of the disk is kept on a different physical drive. If a particular disk fails, the cluster software transparently switches to the mirrored copy of the disk and processing continues.

Typically, a single instance of a database process (also called "Oracle instance") is executing on each of the computers (also called "nodes") that form a cluster. An Oracle instance is composed of processes and shared memory. Within the shared memory is a buffer cache for the Oracle instance. The buffer cache contains disk blocks and improves performance by eliminating disk I/O. Since memory cannot be shared across nodes in a cluster, each Oracle instance contains its own buffer cache. A parallel cache manager (PCM) coordinates access to data resources required by the Oracle instances.

In addition to the buffer cache, several other resources require coordination by Oracle Parallel Server across instances, including dictionary, rollback segments and redo logs. Another component is Cluster Group Services (CGS) that interacts with a Cluster Manager (CM) to track cluster node status and keeps the database aware of which nodes forms an active cluster. The Cluster Manager is a vendor-supplied component specific to the hardware and OS configuration, and unrelated to a database.

Also, Oracle8i provides a load-balancing feature to distribute connections from client computers across the cluster, maximizing transaction throughput and minimizing response time. Load balancing requires monitoring resource utilization levels on each node in the cluster, and directing the client connections to the least, loaded cluster node. In the event of a failure of node 8 (FIG. 1), Oracle Parallel Server can failover a connection with a client 7 to a functioning and least loaded node 9 of the cluster. This is done transparently, i.e., without user knowledge or intervention in the case of query operations.

Oracle8i supports high user populations by using Oracle Multithreaded Server (MTS) configuration. MTS is based on a database resource sharing architecture where processes called "listeners" route client connections to a group of other processes called "dispatchers" that interact with server processes to handle the connections. Oracle Parallel Server environments can be configured with MTS, where each node in the cluster is configured with one or more dispatchers (such as D1 for Instance1 in node 8, and D2 and D3 for Instance2 in node 9, as illustrated in FIG. 1). In Oracle8i, the listeners (such as L1 and L2 in FIG. 1) can be configured locally or on remote nodes to provide greater scalability and system availability.

To facilitate load balancing, Oracle instances on each node register with and communicate with all the listeners regarding CPU utilization in each node. Implementation phases for load-balancing in the example of FIG. 1 include: client connections are distributed in a random fashion across available listeners, L1 and L2. The randomized load balancing policy ensures that client requests are spread efficiently across available listeners. Assume that L1 was chosen to receive the client request. Listener L1 compares the CPU load on the two computers.

If the second computer (containing dispatchers D2 and D3) is less loaded, listener L1 chooses the second computer. This allows the least loaded node to process incoming client connections. The listener L1 then compares the load, or active connections, on the dispatchers, D2 and D3. If Dispatcher D2 is less loaded than Dispatcher D3, listener L1 will choose to direct the client request to Dispatcher D2. This allows the dispatcher with the least number of active connections to process the incoming client connections.

When one or more new instances are to be added to Oracle Parallel Server during operation, one may bring down the database and recreate the entire database from scratch with new instances included. For example, see "Adding Additional Nodes to a Cluster" on page 9-7 of Oracle8i Parallel Server Setup and Configuration Guide, Release 2 (8.1.6), December 1999, Part No. A76934-01 that is incorporated by reference herein in its entirety.

SUMMARY

In an application executing in multiple computers connected by a network, an instance of the application is deleted from a group of instances that share a resource, such as a database. Specifically the to-be-deleted instance is shut down, followed by deleting connectivity between the to-be-deleted instance and the network, and then deleting an object of the to-be-deleted instance. Each of these acts is performed automatically without user input, once the user issues an instruction to delete the to-be-deleted instance.

BRIEF DESCRIPTION OF THE DRAWINGS

FIGS. 7-19 illustrates screens for a graphical user interface used to receive user input in one implementation.

DETAILED DESCRIPTION

In accordance with the invention, a new instance is added to a group of instances that are executing in a number of computers, in the following manner. Environment for the new instance is created, e.g. based on a template which may be predetermined or based on an existing instance. Specifically in one embodiment, one or more objects required by the new instance is obtained by copying and renaming (in an act known as "cloning") a corresponding object of an instance that is currently existing in the group, as illustrated in act 10 of FIG. 2.

In one embodiment, act 10 is performed automatically, by one of the multiple computers, in response to a user's instruction to add the new instance. Moreover, connectivity between the new instance and the group of instances is also set up (automatically in this embodiment) as illustrated by act 20, and the instance is started as illustrated by act 30 (again automatically in this embodiment).

Figure 1:
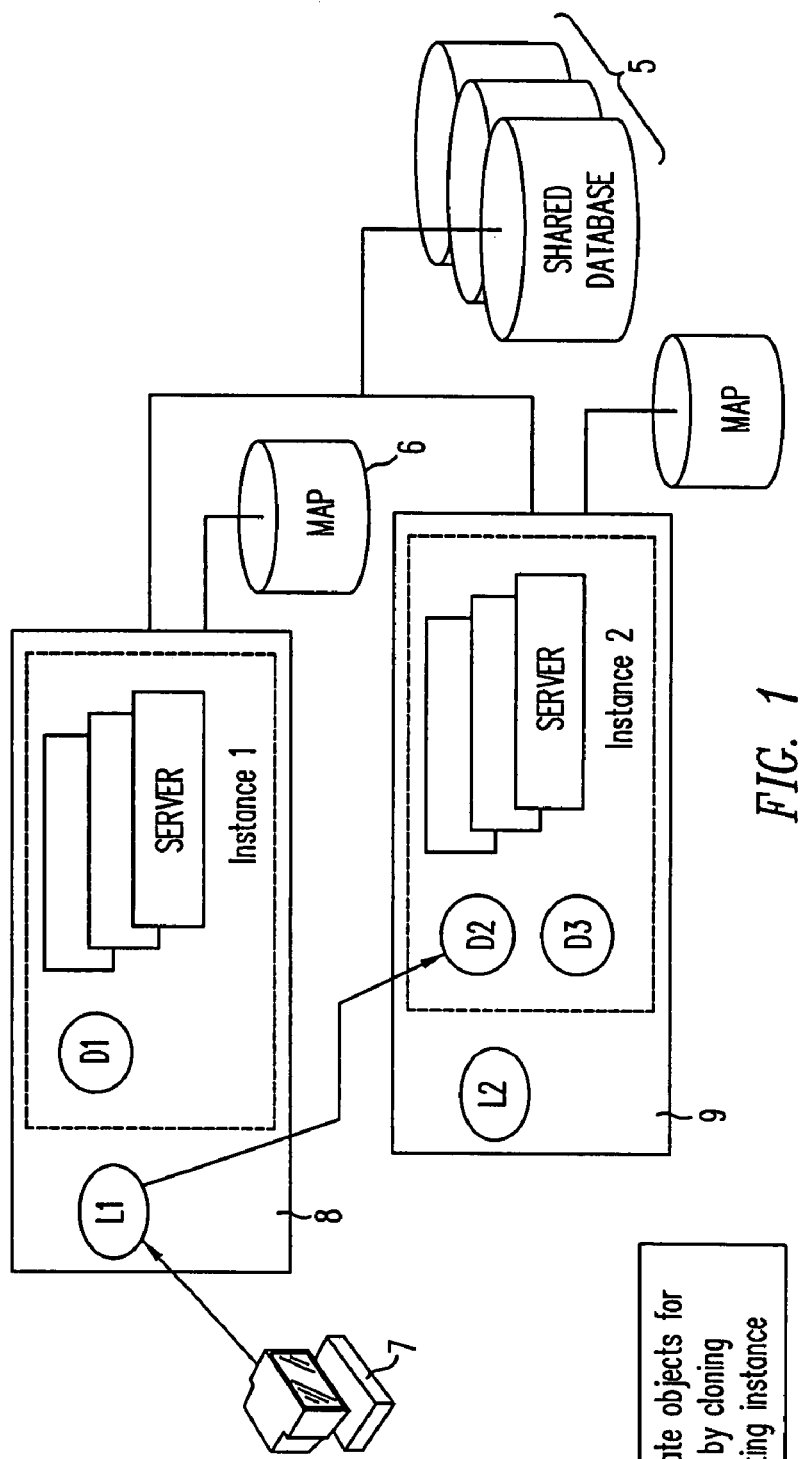
FIG. 1 illustrates, in a block diagram, a cluster of computers executing multiple instances of a database server in the prior art.
Figure 2:
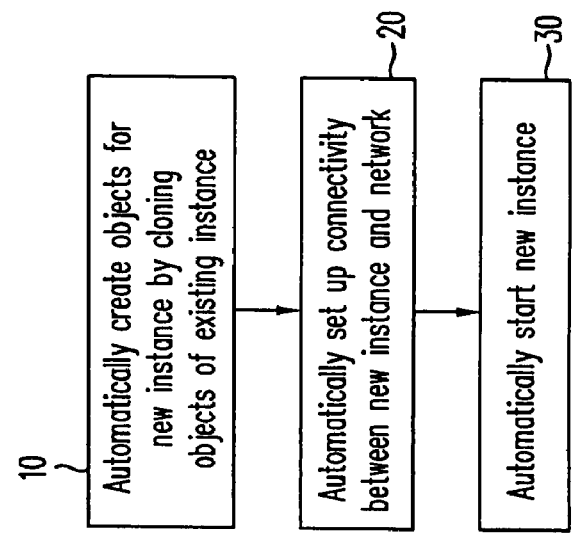
FIG. 2 illustrates, in a flow chart, acts performed by a computer programmed in accordance with the invention.

Although acts 10, 20 and 30 are illustrated in FIG. 2 in a specific sequence, this is just one embodiment, and in other embodiments other sequences may be used. In another embodiment, the order of acts 10 and 20 can be reversed, e.g. the connectivity may be set up prior to creation of the objects needed by the new instance. Moreover act 30 may be performed first and the new instance can trigger the execution of (and wait on) acts 10 and 20, or alternatively the new instance may itself perform acts 10 and 20.

Furthermore, objects 43I (FIG. 3) of any existing instance can be used to create the cloned objects 43J, depending on the embodiment. In one specific embodiment, objects 43I belong to an instance in a computer that performs acts 10, 20 and 30, i.e. a local instance. However, in other embodiments, instances in other computers may be used when performing cloning. For example, a user may be queried as to which instance happens to be the most similar to the new instance to be created, and thereafter such an instance's objects may be cloned.

As used herein, the term "instance" denotes any process (or group of processes) among a number of processes that execute (in the same processor or in different processors) the same software instructions, and that perform data processing, using a shared resource, such as a database. However, instances as used herein are not limited to sharing a database, and instead may share other kinds of resources that are normally shared in a parallel application of the type described above. Depending on the embodiment, such instances may receive and work on portions of a single task, such as a single query to the database, if such a task can be subdivided.

Also depending on the embodiment, such instances may need to coordinate with one another, and exchange partial results from time to time. Furthermore, depending on the embodiment, such instances may maintain data separate and distinct from the data of other instances (e.g. in their respective local disks), so that the other instances cannot access such data. Also depending on the embodiment, the just-described data may be a database, so that each instance has its own database (also called "database partition") which other instances cannot access, although all database partitions share the same system directories. Such instances may also have security features separate and distinct from security features of other instances. As noted above, multiple instances may execute in the same computer, although in one embodiment illustrated in FIG. 3 there is only one instance in each computer.

Regardless of the embodiment, each of the above-described instances share a resource 41 (FIG. 3) among each other, and such a shared resource may be, for example, data that is being processed by each of the instances, as in the case of a database server, or alternatively can be software that is being served out to various client computers, as in the case of an application server. In alternative embodiments, shared resource 41 need not be in the form of information (i.e. code and/or data) and instead may be some hardware, such as networking equipment.

A shared resource of one embodiment is a physical file, which is commonly shared among each of the instances. Depending on the implementation, software for implementing a cluster may include a distributed lock manager that arbitrates access to such a shared resource. However, in an alternative embodiment, nothing is physically shared by the instances, and instead the instances logically share data so that the data as a whole has the appearance of a shared resource although individual pieces of the data are maintained by each instance. For example, if there are two instances A and B, the first instance A may maintain five pieces of data, and the second instance B may maintain another five pieces of data, and when the data piece maintained by instance B needs to be accessed and used in some manner by instance A (e.g. for reading or writing), instance A communicates with instance B to perform the operation, and instance B performs the operation on behalf of instance A. In this manner, in this example the ten pieces of data together form a single shared resource available to each of the two instances.

Figure 3:
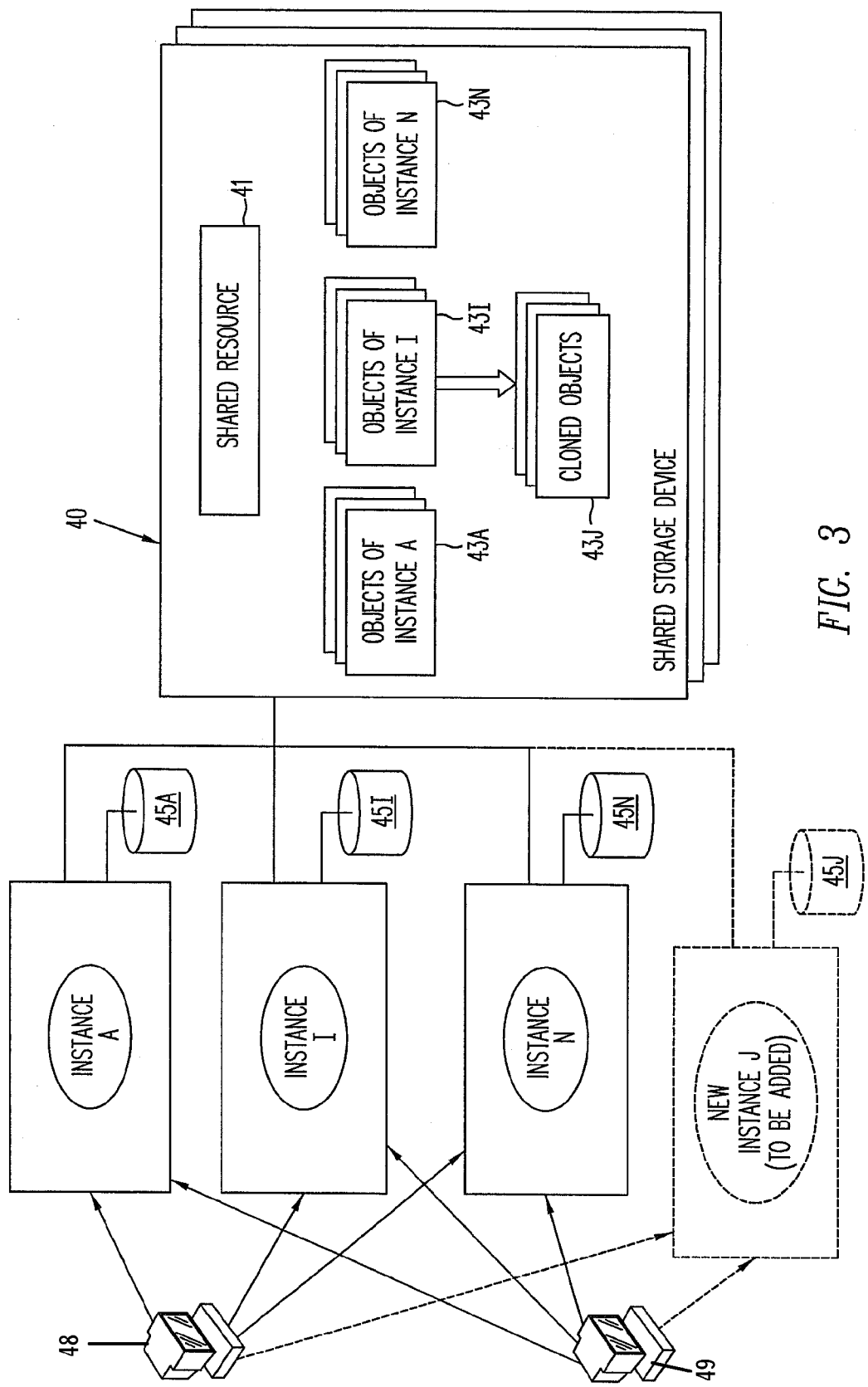
FIG. 3 illustrates, in a high-level block diagram, a cluster of computers including a computer that performs the acts of FIG. 2 to add a new instance to a group of existing instances of an application program, in one embodiment.

As noted above, in addition to the shared resource each of the instances can maintain other information that is separate from corresponding information of other instances, and such instance-specific information may be held in one or more objects 43A-43N (wherein A≦I≦N, wherein N is the total number of objects) with each object 43I being used by a single instance I (FIG. 3). Although a group of three objects is labeled as 43I in FIG. 3, such a group may contain a single object, or any number of objects, depending on the implementation. Such objects are cloned in act 10 described above in reference to FIG. 2, to form the cloned objects 43J for use by a new instance J. Although objects 43A-43N and 43J are illustrated as being physically located in a shared storage device 40 (FIG. 3), depending on the implementation each individual group of objects may be located physically on a storage device that is accessible only by corresponding instance, such as disks 45A-45N and 45J, of the respective instances A-N and J.

In act 20 (FIG. 2) connectivity between the new instance J (FIG. 3) and at least one component in a network of computers is established, in any manner, depending on the embodiment. For example, client computers 48 and 49 (FIG. 3) may be informed of the new instance J so that processes therein can start sending work (as illustrated by the dashed lines) to the new instance. Thereafter, as illustrated by act 30 (FIG. 2), the new instance is started, for example by issuing an operating system instruction to the computer in which the instance J is to be started. As noted above, such a computer may be part of a cluster of computers in which all of the other instances are executing. Depending on the embodiment, all of the above-described instances may be executing in a single computer, or alternatively in computers connected to one another by a local area network or a wide area network.

Automatic addition of a new instance to a group of existing instances as described above in reference to FIG. 2 provides several advantages. Specifically, depending on the embodiment, manual effort in adding a new instance is reduced or even eliminated. Moreover, human errors in a manual process are also reduced or eliminated, thereby to facilitate guaranteed 24×7 uptime. Furthermore, it is no longer necessary to bring down all of the instances of an application, because a new instance can be automatically added on the fly, namely while the other instances are continuing execution.

This feature of adding a new instance on the fly also facilitates guaranteed 24×7×365 uptime without interruption, and helps to meet increasing workload challenges. Therefore, the process described above in reference to FIG. 2 addresses application availability and scalability issues, without ever requiring that existing instances of an application be recycled.

In one specific embodiment, acts 10, 20 and 30 are preceded by one or more preliminary acts 50 (FIG. 4), which may or may not be performed in other embodiments. In the specific embodiment illustrated in FIG. 4, a user instructs a computer (also called "starter computer") to automatically add a new instance to a group of instances of an application. The starter computer may initially consult a data structure (which may be present in the starter computer itself) that identifies all of the hardware resources in a cluster, e.g., a hardware resource profile, to identify a list of computers (also called "nodes") in the cluster.

Thereafter, as illustrated by act 51 (FIG. 4), the starter computer displays the list to a user. The list displayed can be the entire list of all computers in the cluster, or alternatively the starter computer may prune the list to delete the computers in which an instance is currently executing, thereby to obtain a pruned list that identifies only the computers that do not have any instances. Thereafter, in act 52, the starter computer receives from the user the identity of one of the computers in the displayed list in which a new instance is to be added (also called "newbie computer").

Depending on the embodiment, act 51 may be omitted, e.g. if the user's identification of a newbie computer received in act 52 is thereafter automatically verified to ensure that the newbie computer belongs to the cluster. If no list is displayed (because act 51 is omitted), the newbie computer may not belong to the cluster, in which case such a computer may be added to the cluster in the normal manner, if the user desires. For example, the newbie computer's hardware may be manually connected to the hardware of the existing cluster (including formation of electrical connections and network interconnects, shared disk subsystem connections and so on) installing the cluster software on the newbie computer, and if necessary creating raw devices or alternatively supporting a cluster file system.

Next, in act 53, the starter computer automatically checks that the network has connectivity to the newbie computer, e.g. confirms that one or more processes that, implement connectivity of the newbie computer to other processes in other computers of the network are up and running, and are responsive to messages being sent to the newbie computer from the network.

Thereafter, in act 54, the starter computer checks to see if the newbie computer already contains access to software to be executed by the new instance. For example, the software may be available to the newbie computer through a cluster file system. Alternatively, the software may be automatically installed in the newbie computer (by the starter computer) if a cluster file system is not used, or alternatively if the software is not individually present in a local disk of the newbie computer. If the starter computer contains an instance executing therein, the starter computer can copy its own software to the newbie computer (if necessary), and alternatively may copy the software from another computer that contains an instance and therefore has access to the software (such a computer may be identified from a map which is discussed below in reference to act 21).

Thereafter, in act 55, the starter computer automatically sets up resources needed by the new instance in the newbie computer. Examples of such resources include a directory that may be required by the new instance during execution, to write log files, and/or to save data temporarily to disk. The resources that may be set up in act 55 include any resources (such as memory of a minimum size) needed to bootstrap the instance of the application, so that the new instance of the application can come into existence (also called "static configuration"). Such resources may also include state information, and/or initialization values that may be needed by the new instance.

Static configuration includes any information that remains in existence even after the power is turned off to the computer that has one or more instances executing therein. Therefore static configuration is normally held in non-volatile memory. Static configuration also includes a shared map, as well as bootstrap configuration of the type described above. In contrast, run time configuration includes information that disappears when the power is turned off, and includes, for example, database objects for an instance of the database.

Act 55 may be omitted, depending on the embodiment, for example if the new instance is an autodiscovery process which is stateless. Specifically, one or more of the above-described acts 51-55 may therefore be omitted, depending on the embodiment and depending on the circumstances. For example, the newbie computer may have been previously set up during the initial formation of a multi-instance group to be executed on the cluster. If so, all of acts 50 may be skipped. Another example uses a cluster file system, thereby to eliminate act 54. Moreover, if the newbie computer can be identified via a file or environment variable, acts 51 and 52 can be eliminated. Furthermore, although acts 53-55 of one embodiment are performed automatically, in other embodiments such acts may be performed only after seeking and obtaining approval from the user. Therefore, in response to user disapproval one or more such acts 53-55 may be skipped.

Figure 4:
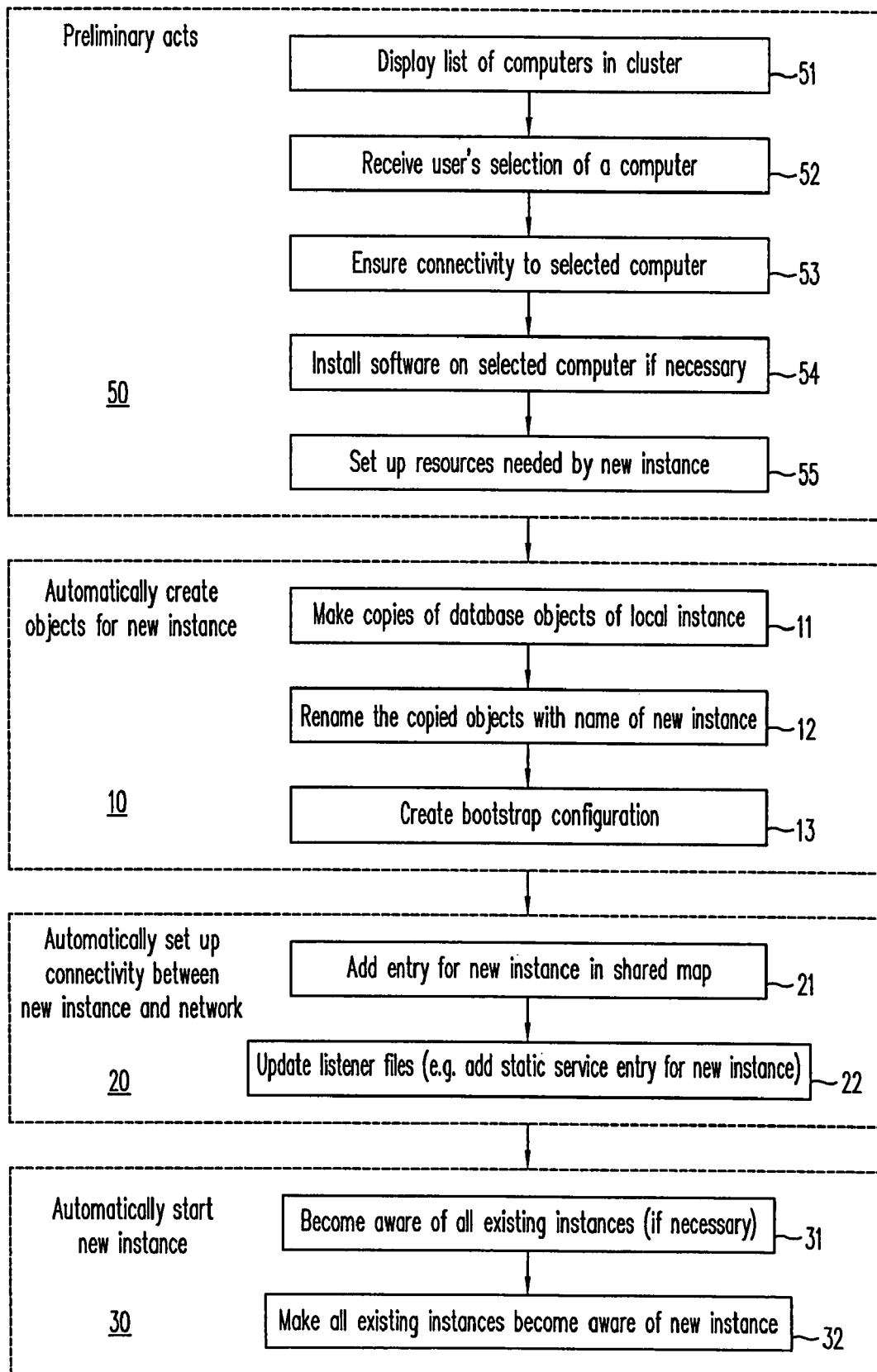
FIGS. 4 and 6 illustrate, in flow charts, one embodiment for respectively adding and deleting an instance of a database application.

In this embodiment, act 10 of (FIG. 4) is implemented by making copies (as illustrated by act 11) of one or more database objects of an instance named in the shared map (which is discussed below in reference to act 21), e.g. redo log groups, and either rollback segments or undo table space, that are normally required to access the shared resource such as a database. The copied objects are renamed with the name of the new instance, as illustrated by act 12 (FIG. 4). Note that the copied objects need not be renamed, e.g. if a table or other mapping is maintained, to identify a specific object as being used by a specific instance. Thereafter, in act 13, a bootstrap configuration is created for the new instance, for use in determining system resources (such as memory size) to be used by the new instance.

In this particular embodiment, in act 20, the starter computer sets up connectivity between the new instance and the network by adding an entry (see act 21 in FIG. 4) for the new instance in a shared map, which identifies a mapping between instances and computers in the cluster. For example, the shared map may be implemented as a table of port numbers at which the instances are listening for messages from the network and Internet addresses on the computers in which the instances are executing.

Specifically, in this embodiment, each of computers 60A-60N (FIG. 5) of cluster 61 are identified in single map 62 that is present in a shared storage device 40, such as a hard disk. Such a shared map 62 identifies each of the instances A-N that is executing on the respective computers 60A-60N. Use of a shared map eliminates the need for each of a number of maps of the prior art to be individually updated in each computer of a cluster. Moreover, use of a shared map 62 as described herein effectively enables management tools to inform even an instance I that is currently down. Specifically, when instance I coms up, it recognizes that a new instance J was added while instance I was down. Advantages of a single shared map include: (1) every instance has the same information and (2) when the map is updated, every instance has the updated information instantly (without delay otherwise resulting from propagation of the update).

In one embodiment, shared map 62 is used only for discovery purposes. Specifically, a tool that is used to start up a new instance uses shared map 62. Shared map 62 may also be used to provide a status check and/or for monitoring of the instances. Instances themselves do not use shared map 62 in this embodiment, and instead the instances (e.g. when they start up) register in a group (for the application) of a cluster group service (which is software of a cluster layer) to discover each other.

Figure 5:
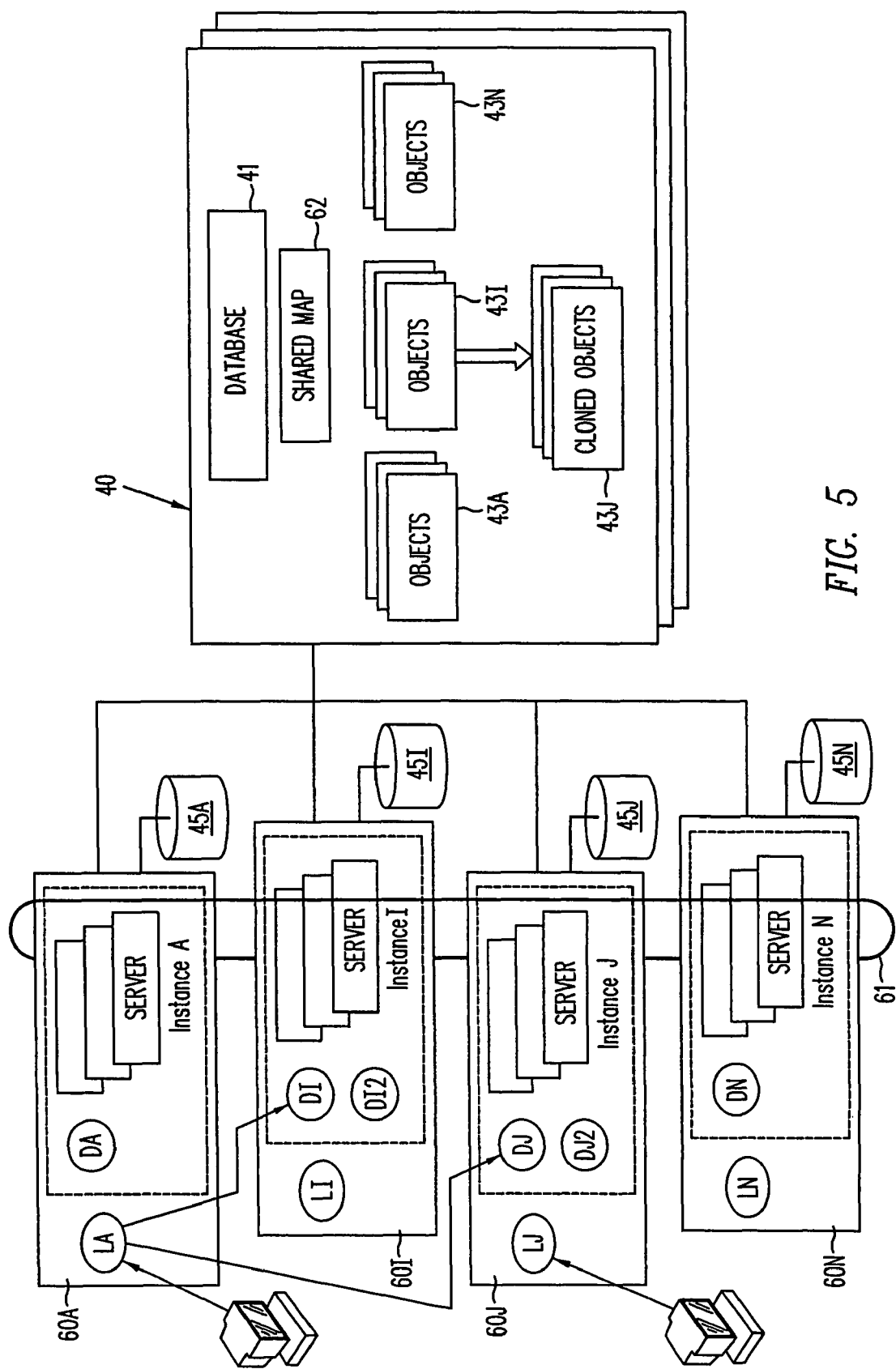
FIG. 5 illustrates, in a low-level block diagram, one implementation of the embodiment illustrated in FIG. 3.

In one specific implementation illustrated in FIG. 5, each of computers 60A-60N also contains a number of listeners LA-LN of the type described above. And for this reason, in act 22, a listener file in newbie computer 60J is updated to add a static service entry for the new instance J in computer 60J. When the new instance J starts, it registers with the listener defined in the listener file.

In one implementation, a file (also called "initialization parameter" file) that is used for bootstrap configuration identifies two kinds of entries: (a) global entries for use in starting up all instances, and (b) instance-specific entries that may be cloned from another instance for use with the new instance. The initialization parameter file can be private to each computer in the cluster, or alternatively can be shared by all computers in the cluster.

Depending on the example, the instance-specific entries may be changed to make the new instance more powerful or less powerful than a previous instance, instead of merely cloning the entries of the previous instance. Such changes may be performed based on user input, for example through a graphical user interface. For more information on the just-described use of listeners, please see the following:

Oracle 9i Net Service Administrators Guide Release 1 (9.0.1) PART No. A90 154-01.

Oracle 9i Database Administrator's Guide Released 1 (9.0.1) PART No. A90-117-01.

Thereafter, in act 30, the new instance J is automatically started in newbie computer 60J. On start up instance J automatically becomes aware (see act 31 in FIG. 4) of all existing instances A-N (e.g. by registering in an application group as discussed above), thereby to allow partial results to be exchanged as may be necessary from time to time. In this embodiment, in act 32, the instance J also makes all of the existing instances A-N become aware of itself, again for exchanging partial results as may be necessary. Depending on the embodiment, acts 31 and 32 may be omitted, for example if there is no need to exchange partial results, as in the case of an application server.

Figure 6:
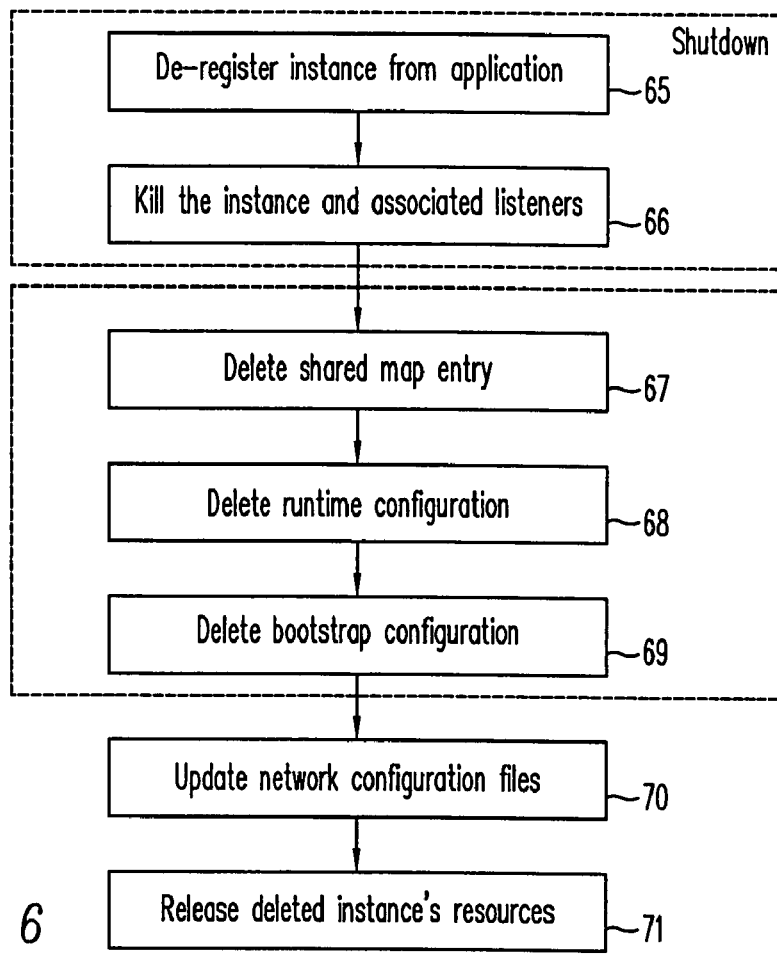

In addition to the above-described process of adding a new instance to a group of existing instances, it's also possible to delete an instance automatically, for example if the instance has become faulty. Specifically, as illustrated in FIG. 6, an instance that is to be shut down is de-registered from the application group defined in the cluster group service and killed. In this particular implementation, the de-registration (see act 65) reverses the results of acts 31 and 32 described above in reference to FIG. 4. Specifically, all of the remaining instances are made unaware of the instance to be deleted. Thereafter, in act 66, the instance to be deleted is killed, for example by issuance of a kill command. In this embodiment, act 66 is implemented as the reverse of act 30 described above.

In a similar manner, acts 67-69 illustrated in FIG. 6 are performed to delete various objects of the killed instance, and are reverse of corresponding acts 21, 10, and 13. Specifically, in act 67, an entry in the shared map is deleted (e.g. by deleting an entry for the killed instance in a map file shared across all computers). This is followed by deletion of the run time configuration in act 68. Thereafter, the bootstrap configuration is deleted in act 69 (e.g. by deleting an entry for the killed instance from a private file in each computer). Next, the network connectivity of the killed instance is deleted, by updating the network configuration files in act 70 (which is reverse of act 22). Execution of act 70 may involve deleting an entry for the killed instance from a file shared across all computers and/or from a file in a computer that described the killed instance. Next, in act 71, the deleted instances resources are released, e.g. a directory associated with the deleted instance is deleted (such as the directory ORACLE_HOME or ORACLE_BASE).

In one specific implementation, acts 10, 20 and 30 are performed for adding a new instance of a database, namely Oracle 9i. The new instance is added automatically by the starter computer programmed with a tool for obtaining certain information from the user through a graphical user interface as illustrated by acts A1-A15 described below. Another set of acts D1-D13 also described below are used by such a computer to implement acts 65-71 (for deleting an instance of the Oracle 9i database). The following description of acts A1-A15 and D1-D13 is merely illustrative of one specific implementation. One or more of the following acts may be modified or their order changed or the acts may be simply omitted, depending on the specific embodiment. Other implementations and embodiments will be apparent to the skilled artisan in view of the enclosed disclosure.

Implementation Detail for Automatically Adding an Instance:

A1. User starts the tool and chooses the "add instance management" option.

A2. Tool provides a list of currently existing databases on the cluster by looking into the shared map (which contains an entry for each instance identifying the computer on which the instance is executing.

A3. User selects the database to add an instance to. If the user doesn't have SYSDEA privileges, then tool asks for the user credentials (like user name & password)

A4. Tool validates that a database instance is running in the local computer (i.e. starter computer) by interacting with the clusterware software (such as IBM's Phoenix) that provides group services (e.g. by providing as input to the software, the name of the database), and verifies that the user's credentials are valid. Note that the database being looked up is a database on the cluster (also called "cluster database"). A cluster database is a database that has multiple instances running on nodes of the cluster, accessing that database. Also the tool verifies that daemon is UP on local computer by interacting with the clusterware software (e.g. providing the daemon name as input). If these conditions are not satisfied, the tool displays a dialog that says to the user (e.g. database administrator) what's wrong and how to correct it. For example, the tool displays a message indicating to the user the command to start up the daemon. The tool also determines the current instances-to-nodes map by looking into the shared configuration store for the chosen database.

A5. The tool uses a heuristic to construct a default name for the new instance to be added. In one example, this heuristic is based on whether the existing instance names have a common name prefix (database name prefix). If so, the tool finds the largest numeric suffix and adds one to it to construct the new instance name. Else the tool leaves the instance name field blank. Also, the tool displays a list of available nodes. This list can be either all nodes in the cluster, or just the nodes on which the chosen database doesn't have an instance (the latter is used in this implementation).

A6. The user may enter the instance name (if there was no default or user would like to name the new instance differently) and choose the node on which to add it.

A7. The tool verifies that Oracle software is already installed on the chosen node (it checks for existence of ORACLE_HOME/bin/oracle file) and also checks that the related daemon is running by interacting with clusterware software (e.g. cluster manager) on the chosen node (e.g. by providing the daemon name as input). If these are not satisfied, the tool displays a dialog message and provides suggestions on how to correct the problem.

A8. The tool determines the Undo management mode, server parameter file name and next redo log group number by making a connection to the instance in the local computer. The tool computes the next redo log group number as MAX (redo)+1, determines the listener names configured on the node selected above in the ORACLE_HOME. In one example, listener names are kept in a file, named listener.ora. These listeners will be associated with the new instance when it is added. Also get a copy of the database objects e.g. undo tablespace or rollback segments, redo log groups, by making a connection to the instance in the local computer.

For example, the following query is made to the local instance.

1. For Undo Tablespace:
   Select value from V$parameter where name='undo_tablespace';
2. For Rollback Segments:
   a. First determine local instance number from instance name.
   Select instance_number from gv$instance where instance_name='<local_instance_name>';

In the above query, the last term (in angle brackets) is replaced with the actual name of this instance.
   b. Find rollback segment names associated with instance_number.
   Select segment_name from sys.dba_rollback_segs where segment_name !='SYSTEM' and instance_num=<instanceNum>;

In the above query, the last term (in angle brackets) is replaced with the actual number obtained in the previous query.

3. For redo logs:
   a. Find thread number from local instance name. Select thread# from v$thread where instance='<instanceName>';

In the above query, the last term (in angle brackets) is replaced with the actual name of this instance.
   b. Find redo log groups from thread#.
   Select group# from v$log where thread#=threadnum obtained in 3.a.

For more information, please refer to Oracle 9i SQL Reference Release 1 (9.0.1), part number A90125-01.

A9. Update names of the objects copied in act A8. If using automatic management, update the undo tablespace name and it's data file name else update rollback segment names in the cloned objects. The tool uses the following heuristics:
   constructs undo tablespace name as "UNDOTBS" followed by n, where n=no. of existing instances +1;
   constructs undo tablespace datafile name by appending "_" followed by the new instance name to the undo tablespace datafile name in the cloned object;
   constructs rollback segment names by appending "_" followed by new instance name constructed in step A6 above after the rollback segments name for the local instance;

For each cloned redo log group object this tool updates the following: group number by starting with next redo log group found in step A8 and then incrementing it by 1; data file name by appending the "_" followed by new instance name.

A10. If the selected database uses raw devices, the tool replaces the data file names for the undo tablespace and redo group logs with the raw devices found in a file referred to by DBCA_RAW_CONFIG environment variable. The users can change these data file names on the user interface as well. If using the manual undo management, the users can change the default rollback segment names in the user interface.

Here the users can also change the storage properties like data file sizes, extents etc. to make the new instance less or more capable than the existing instance. Not changing the storage properties ensures that the new instance is as capable as the local instance.

A11. The tool creates the Oracle Flexible Architecture directory structure on the node selected for the new instance.

A12. The tool adds static configuration (the act A12 may be skipped if autodiscovery is used and if instances are stateless and fail when resources are insufficient):
   For Windows platform: Adds an entry of the system identifier SID to the registry on the new instance's node.
   For Unix platform: Adds database entry to the oratab file on the new instance's node. For more information on the oratab file, see Oracles 9i Real Application. Clusters Installation and Configuration, Release 1 (9.0.1) Part No. A 89868-02.
   Adds the instance-node map entry for the new instance to the shared configuration store. Information for use in the map entry comes from, e.g. Step A6 described above.
   Creates orapwSID file on new instance's node by copying it from local instance's node. This file holds a password for a system user to be used for remote authentication. For more information, see Oracle 9i Database Administrator's Guide, Release 1 (9.0.1) Part No. A 90117-01.

A13. The tool creates runtime environment for the new instance as follows:

determines the instance thread number for the new instance. It is either MAX (threads) +1 or if there are holes in thread assignment, then the tool picks the first hole as the thread for the new instance;
  creates the new instance thread in the database and associates it with the redo log groups database objects constructed in act A9 above;
  enables the new instance thread;
  if using automatic undo management, creates the undo tablespace for the new instance from the database object constructed in act A9. Else, creates the rollback segments from the database objects constructed in act A9 above;
  add instance specific parameters e.g. instance_name, thread, instance_number, local_listener, undo_tablespace or rollback_segments parameters to the server parameter file, either on the local node or preferably in the shared parameter file on a raw device. The just-described "shared parameter" file is different from the previously-described "shared map." The shared parameter file is used to initialize the new instance on startup, and contains initialization parameters, such as memory requirements.

In contrast, the shared map contains, e.g. a name of a database, names of instances that make up the database, and a mapping of each instance to the node in which it runs. Such a shared map is stored in a disk shared by all nodes in one embodiment. Depending on the size of the cluster and partitions of the cluster, a single shared map may hold such information for multiple databases, and alternatively a shared map for each database may be stored separately in different shared disks.

increment the cluster_database_instances by one and max_rollback segments by the number of rollback segments created above when using manual undo management.
  if not using shared parameter file, copy the updated server parameter file to all nodes (including the new instance's node) on which the cluster database has instances;
  create initSID.ora file on the new instance's node; and
  for Windows platform, start the SID service on the new node's instance.

A14. The tool updates network configuration as follows:

adds static SID entry for the new instance to the listener.ora file on the new instance's node;
  adds net service entries for the new instance to the tnsnames.ora file so that local and cross instances registration can take place when the new instance and its listener(s) are started. For a description of the service entries, the tnsnames file & local, cross registration see Oracle 9i Net Services Administrator's Guide Release 1 (9.0.1) Part No. A 90154-01. The tool copies tnsnames.ora file from all but the new instance's node, to the local instance's node, and adds the network service entries for the new instance to them and copies the file back to where they came from. The tool copies the local instance's tnsnames.ora file to the new instance's node. Alternatively, the tool could enumerate all service entries for the database from the local instance's tnsnames.ora file, and add the enumerated entries to the new node's tnsnames.ora file.

A15. The tool starts the listener on the new instance's node, and starts the new instance on its configured node.

Implementation Detail for Automatically Deleting an Instance:

D1. User starts the tool and chooses the "delete instance management" option.

D2. Tool provides a list of currently existing databases on the cluster by looking into the shared configuration store.

D3. User selects the cluster database to delete an instance from. If the user doesn't have SYSDBA privileges, then the tool asks for the user credentials (like user name & password).

D4. Tool validates local database instance is UP by interacting with clusterware software (e.g. cluster manager) by providing a database name obtained in Step D3 as input. If not, it displays a dialog that provides instructions to be used to correct whatever is wrong. The tool determines the current instances to nodes map by looking into the shared configuration store for the chosen cluster database.

D5. The tool determines the instance names that make up the database selected above by looking into the shared configuration store. The tool finds the aliveness status of the instances by interacting with cluster manager (by providing the database name as input) and displays the instance names and their status (ACTIVE/INACTIVE) in the user interface. The tool also determines the Undo management mode and server parameter management file name by making a connection to the local instance. An ACTIVE status allows the tool to determine the database objects e.g. undo tablespace or rollback segment names, instance thread, redo log group numbers and their associated log files etc. for the instance to be deleted, else the tool deletes the static configuration only.

D6. The user selects the instance to be deleted. If the selected instance is a local instance, the tool displays a dialog saying that chosen instance should not be deleted by using the tool. In this implementation, one instance must be deleted only by using the method used to create it. Therefore, in this implementation, the user selects a remote instance for deletion, and therefore the local instance is not deleted using the tool.

Note that the tool may execute in a computer that does not have an instance, in which case the tool may ensure that if the to-be-deleted instance is the only instance then it is not deleted. In another embodiment, the tool allows deletion of any instance, even if it is the only instance left.

D7. The tool automatically determines the instance-to-node mapping from the shared configuration store. Using the node information, the tool determines if the daemon is running on it by interacting with the cluster manager on the node, by providing the daemon name as input. If the daemon is not running, the tool shows a dialog that tells the user how to start it.

D8. The tool determines the instance-specific database objects, e.g. instance thread number, undo tablespace name and server parameters for the instance to be deleted. If the instance to be deleted was UP, the tool runs SQL queries, else deletes all parameters that have SID prefix that is same as the instance to be deleted. Also, the tool determines the names of the listeners associated with the instance to be deleted, e.g. looking for these names in the file listener.ora on the to-be-deleted instance's node. This can be done irrespective of whether the instance or the listener was UP or not.

D9. The tool brings down the runtime environment as follows:
- if the instance to be deleted was UP, the tool shuts it down using IMMEDIATE mode. This deregisters the instance from the cluster database group and the instance from its listener.
- stops all the listener(s) associated with the instance to be deleted. This is a forced operation, and the tool ignores all possible errors.

D10. The tool deletes the static configurations as follows:
- deletes the instance-to-node map entry from the shared configuration store;
- for Unix platform: deletes the cluster database entry from the oratab file on the deleted instance's node;
- deletes the initSID.ora, orapwSID, and lkDB_NAME files from the ORACLE_HOME/dbs directory for Unix or alternatively deletes the initSID.ora and PWdSID.ora files from ORACLE_BASE\database directory for Windows platforms on the deleted instance's node; See Oracle 9i Real Application Clusters Installation and Configuration, Release 1 (9.0.1) Part No. A 89868-02.
- deletes the Oracle Flexible Architecture (OFA) folder (e.g. ORACLE HOME/admin/<DB_NAME>) and ORACLE HOME/oradata folder from the deleted instance's node; and
- for Windows platform only, deletes the SID entry from the registry on deleted instance's node.

D11. The tool deletes the database objects as follows:
- from the instance thread number found in act D8 above, the tool determines the redo log group numbers and their associated redo log files. The tool disables the instance thread and drops the redo log files; and
- The tool, using UNDO Management mode, drops the undo tablespace found in act D8, else executes SQL statements to find the rollback segments and drop them for the deleted instance.

D12. The tool updates the server parameters file as follows:
- decrements the cluster_database_instances count by 1;
- deletes the deleted instance specific parameters e.g. thread number, instance_name, instance_number, undo_tablespace (if using automatic undo management) or rollback_segments (if using manual undo management);
- if using manual undo management, decrements the max_rollback_segments parameter by the number of rollback segments deleted in act D11; and
- If not using shared parameter file, copy the updated server parameter file to all the remaining instances' nodes.

D13. The tool updates the Network Configuration as follows:
- deletes the SID entry from the listener.ora file on the deleted instance's node;
- deletes the network service entries for the deleted instance from all instances' nodes (including the deleted instance's node) of the cluster database as follows:

Copy tnsnames.ora file from all instance's nodes (including the deleted instance's node) to the local instance's node. Delete the network service entries for the deleted instance from them and copy the file back to where they came from. For the deleted instance's node, the tool deletes all the network service entries for the database.

The above-described acts D1-D13 leave the deleted instance's environment in a clean state as it was presented to the tool before adding an instance.

Prior to the addition of an instance, a user may need to add a node to a cluster, e.g. at a clusterware layer.

The method for adding nodes at the clusterware layer is operating-system dependent. On UNIX, unless the user has preconfigured clusterware to accommodate additional nodes, the user cannot dynamically add nodes. Therefore, the user must stop the clusterware and reconfigure the cluster to accommodate additional nodes. Thereafter the user can add new nodes without stopping the database because UNIX cluster has been already preconfigured to accommodate additional nodes.

To prepare a new node for addition to the preconfigured cluster, the user ensures that it is an exact clone of the existing nodes in terms of vendor operating system, clusterware software, and so on. Then the user performs the following tasks U1 and U2 in the order shown to add a new node at the clusterware layer on UNIX.

U1. The user connects the new node's hardware to the existing cluster. This includes electrical connections, network interconnects, shared disk subsystem connections, and so on, using hardware vendor documentation for details on this step.

U2. The user installs the cluster software by referring to the vendor's installation procedures, and uses cluster vendor documentation for procedures to make the new node an active member of the cluster.

If the user's platform supports a cluster file system and the user is not using raw devices for cluster database, then need to create raw devices as described next. As part of the preinstallation steps before installing the Oracle database software on the new node, the user creates at least two new disk volumes to accommodate the redo logs for the new instance. For an example, refer to Oracle9i Real Application Clusters Installation and Configuration (that is incorporated by reference herein in its entirety) for the requirements for these redo logs and the preinstallation steps. This document also describes other information such as how raw partitions are to be created on Windows platforms.

Next, the user makes the disk volumes for the redo logs the same size as the redo log volumes that were configured for existing nodes' instances. Refer to clusterware vendor documentation for procedures on creating disk volumes and raw devices.

If the database to which the user wants to add a new node and instance uses automatic undo management, then the user creates at additional raw volume for the new undo tablespace for the new instance. After completing this step, the user proceeds to adding an instance of the database.

Instead of adding a node in the Unix environment, a user may add a node in Windows environments. Assume that there is already a Windows cluster running the database. Also assume that the new node uses the same operating system that is running on the existing nodes of the cluster. In other words, Microsoft Windows NT 4.0 or Windows 2000 is installed on all the nodes in the cluster. If so, the user performs the following tasks W1-W4 in the order shown, to add a new node at the clusterware layer on Windows NT and Windows 2000.

W1. The user connects the new node's hardware to the existing cluster. This includes making electrical connections, network interconnects, shared disk subsystem connections, and so on. Refer to hardware vendor documentation for details on this step.

W2. The user installs cluster software as follows:

If using operating system vendor supplied clusterware on the existing nodes, also install this vendor software on the new node using vendor's installation procedures.

However, if using Oracle Corporation's reference clusterware/operating system-dependent (OSD) software on the existing nodes of the cluster, the user must also install these Oracle OSD clusterware on the new node using the Cluster Setup Wizard. To do this, the user must perform the following steps from one of the existing nodes before running the wizard:

O1. If using the Virtual Interface Architecture (VIA) interconnect on the existing cluster, the user must make sure that VIA interconnect is also installed on the new node.

O2. If the user has a private interconnect network on the existing cluster, the user must make sure that the private interconnect network is also installed on the new node.

O3. The user must determine the disk drive on which the cluster software was installed on the existing nodes, and make sure that at least 2 MB of free space on the same drive is available on the new node to install the OSD clusterware and the Object Link Manager.

O4. The user must make sure that one can execute following from each of the existing nodes of the cluster:

NET USE \\host_name\C$ where the host_name is the public network name of the new node. The user has administrative privileges on each node if the operating system responds with:

Command Completed Successfully.

O5. To install the Oracle OSD clusterware when the new node already has a version of the vendor OSD clusterware installed, the user must make sure the vendor OSD clusterware is stopped. Otherwise, the user must continue to the next step.

O6. The user must insert CD number one from the Oracle9i release 1 (9.0.1) CD set into the new node's CD-ROM drive.

O7. The user must navigate to the PREINSTALL\CLUSTERSETUP directory, for example:

cd \PREINSTALL\CLUSTERSETUP

O8. The user then runs the Cluster Setup Wizard by entering the following from the \PREINSTALL\CLUSTERSETUP directory:

clustersetup

O9. The cluster setup wizard displays its Welcome Page. Click Next to proceed.

O10. The user checks the Node Addition option and clicks Next.

O11. The user provides a public name for the new node to be added. If the existing cluster also uses a high speed private network, the user provides a name for the private network interface for the new node and clicks Next.

O12. The user clicks finish.

As part of the preinstall requirements before installing the software on a node for a database, the user must create raw disk partitions, e.g. create at least two new disk partitions to accommodate the redo logs for the new instance. The user may make these disk partitions the same size as the redo log partitions that were configured for the existing nodes' instances. If the database to which a node is to be added uses automatic undo management, then the user creates an additional logical partition for the undo tablespace.

For Windows 2000 only, the user should use a basic disk as an extended partition for creating raw partitions.

Thereafter, to create partitions, the user performs the following tasks from one of the existing nodes of the cluster:

P1. The user starts Disk Administrator using the path: Start>Program>Administrative Tools>Disk Administrator P2. The user clicks inside an unallocated part of the extended partition.

P3. The user chooses Create from the Partition menu. A dialog box appears in which the user enters the size of the partition. The user must ensure that the same sizes used on existing nodes are used here.

P4. The user clicks on the newly created partition and selects Assign Drive Letter from the Tool menu.

P5. The user selects Don't Assign Drive Letter, and click OK.

P6. The user repeats the last four-steps, Steps P2 through P5, for the second and any additional partitions.

P7. The user selects Commit Changes Now from the Partition menu to save the new partition information.

P8. For Windows NT only, the user may need to reboot all the nodes in the cluster if using a pre-4.0 Service Pack, to make all of the nodes recognize the new partitions.

After creating disk partitions as described above in reference to act P1-P8, the user must create links to the partitions so the existing nodes recognize these links. In addition, the new node should also recognize the pre-existing symbolic links to logical drives as well as the new links. To create these links, the user must perform the following acts L1-L5 from one of the existing nodes:

L1. The user must start the Object Link Manager by typing the following from the %ORACLE_HOME%\bin directory:
GUIOracleOBJManager The Object Link Manager automatically detects the symbolic links to the logical drives and displays them in a graphical user interface (GUI).

L2. Next, the user identifies in the GUI of the Object Link Manager the disk and partition numbers for the partitions that were created by acts P1-P8, and performs the following tasks:
   a. right-clicks next to the box under the New Link column and enters the link name for the first partition.
   b. repeats step a. for the second and any additional partitions.

For example, if database name is db and it consists of two instances running on two nodes and the user is adding a third instance on the third node, link names for redo logs are db_redo3_1, db_redo3_2, and so on. If the existing database uses automatic undo management, then the user enters the link name for the logical partition for the undo tablespace. In the just-described example, link name for the undo tablespace will be db_undotbs3.

3. The user selects Commit from the Options menu, to create the new links on the current node.

4. The user selects Sync Nodes from the Options menu, to make the new links visible to the existing nodes of the cluster.

5. The user selects Exit from the Options menu to exit the Object Link Manager.

At this point, the user has added the new node to the cluster at the clusterware layer. To add a node and an instance to an existing cluster at the database layer, it is necessary to install the database software on the new node, perform certain post-installation steps discussed below, and add a database instance on the new node.

Specifically, to install the database software (such as Oracle) on the new node, the user must perform the following acts I1-I9.

I1. If the platform supports a cluster file system, then the user proceeds to post-installation discussed below.

I2. On the new node, the user inserts the database software CD-ROM into the computer, e.g., inserts Oracle 9i release 1 (9.0.1) CD-ROM into the new node's CD-ROM drive.

I3. The user runs the installer (e.g. Oracle Universal Installer) using one of the following procedures. On UNIX, the user runs the installer by executing the runInstaller command from the root directory of the first Oracle CD. On Windows NT and Windows 2000, run the Installer by executing the setup.exe command.

I4. On the File Locations page in the Path field under the Destination heading, the user enters the ORACLE_HOME into which the database software is to be installed, e.g. Oracle Enterprise Edition and Real Application Clusters software. The ORACLE_HOME entered should be the same as the ORACLE_HOME that the existing nodes use.

I5. On the Available Products page, the user selects database, e.g. Oracle 9i.

I6. On the Install Types page, the user selects Enterprise Edition. The Installer displays the Database Configuration page.

I7. The user follows the user interface instructions to install the same products and options that were installed on the existing nodes. Or the user may select the Software Only configuration option on the Database Configuration page.

I8. On the Node Selection page, the user selects only the current or new node name because the software is already on other pre-existing node names.

I9. When the installation of the database software is completed, the user must run the post installation script root.sh, then exit the installer and proceed to post-installation.

From the new node, the user performs post-installation as follows. The user configures a new listener for the node, e.g. by running the Oracle Net Configuration Assistant from the bin directory in ORACLE_HOME.

Then the user completes any post-installation steps for their platform by referring to platform-specific database documentation.

To add an instance on the new node, the user goes to one of the existing nodes that has a running instance and performs the following acts K1-K13 (which are described for an example of Oracle as the database).

Figure 7:
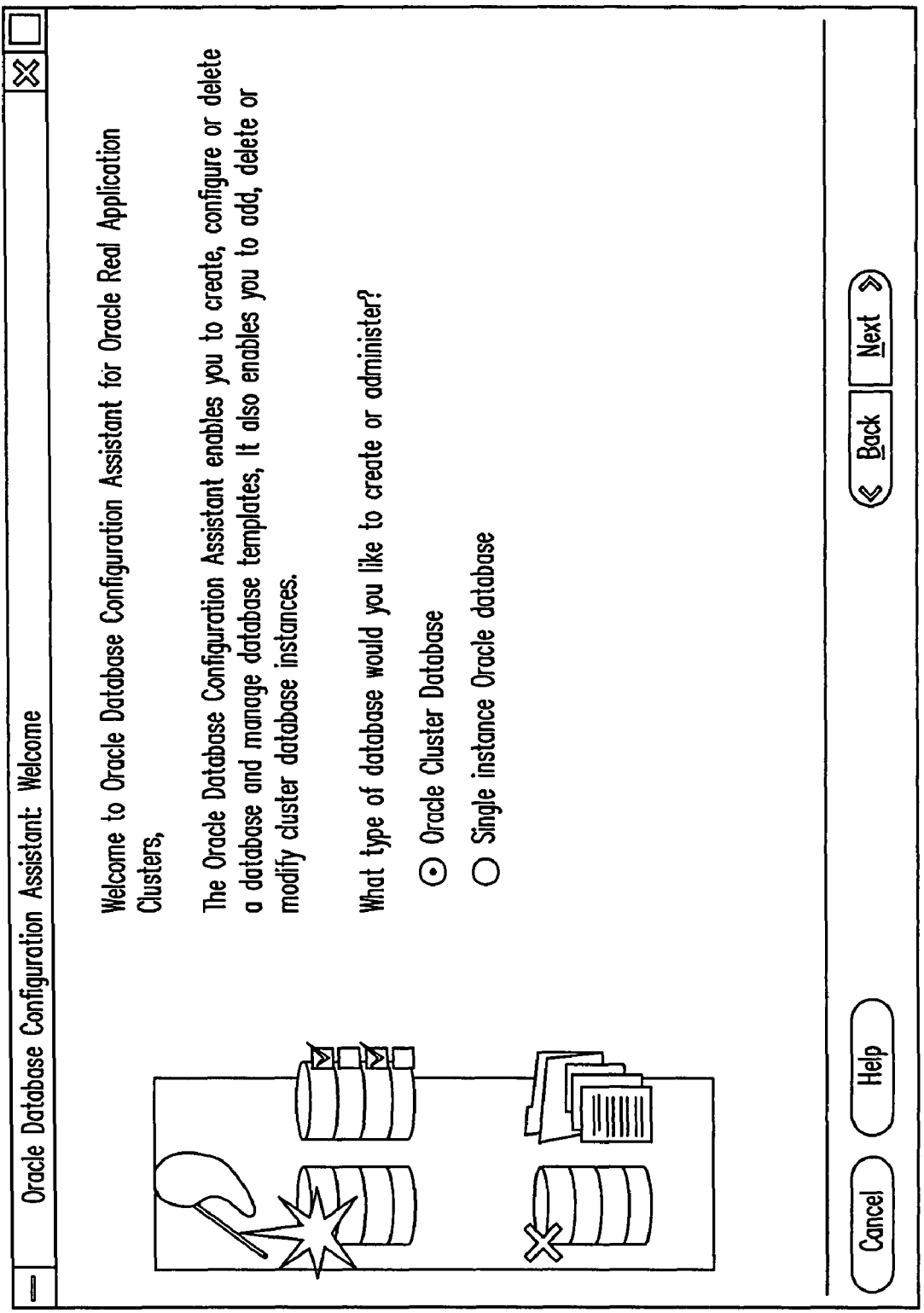

K1. The user makes sure the Global Services Daemon (GSD) is running on all the existing nodes as well as on the new node. If the GSD is not running: on UNIX, enter the command $ORACLE_HOME/bin/gsd to start it;

On Windows NT and Windows 2000, enter the following command %ORACLE_HOME%\bin\gsdservice—start to start the OracleGSDService:

K2. The user launches the Oracle Database Configuration Assistant by typing dbca in the bin directory in $ORACLE_HOME on UNIX, or on Windows NT and Windows 2000, choose Start>Programs>Oracle for Windows NT/2000—[HOME_NAME]>Database Administration>Database Configuration Assistant. The DBCA wizard starts and displays the Welcome Page for Real Application Clusters shown in FIG. 7. If the Welcome Page for Real Application Clusters does not display, it means the Oracle Database Configuration Assistant was unable to:

Communicate with the Cluster Manager (CM) software on Windows NT or Windows 2000

Detect the Global Cache Service (GCS) software or the lists of nodes in the cluster on UNIX operating systems To resolve this, refer to Clusterware vendor's operating system-dependent documentation and then restart the DBCA.

Figure 8:
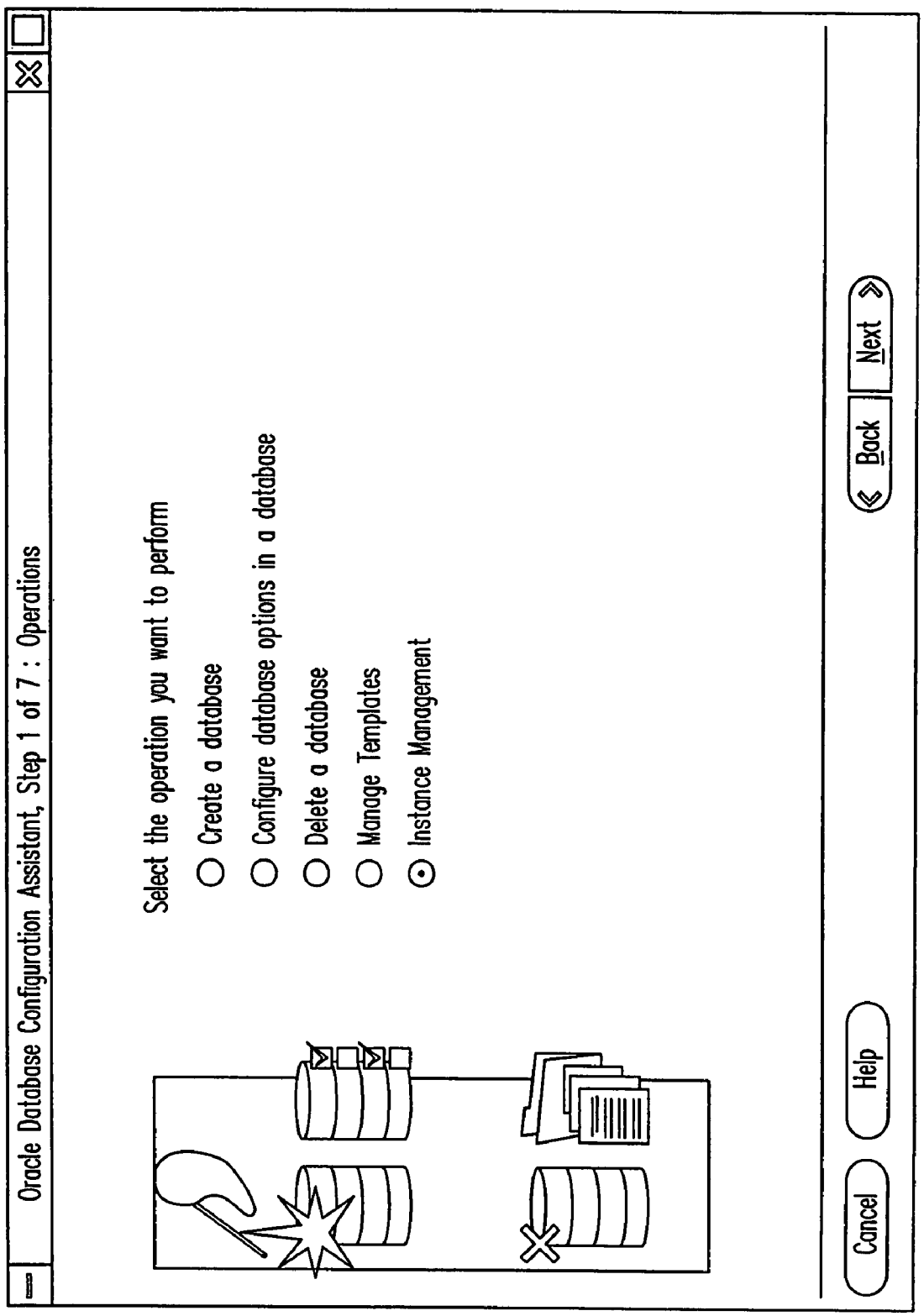

K3. The user selects the Oracle Real Application Clusters Database option and click Next. After the user click Next, the DBCA displays the Operations Page as shown in FIG. 8.

Figure 9:
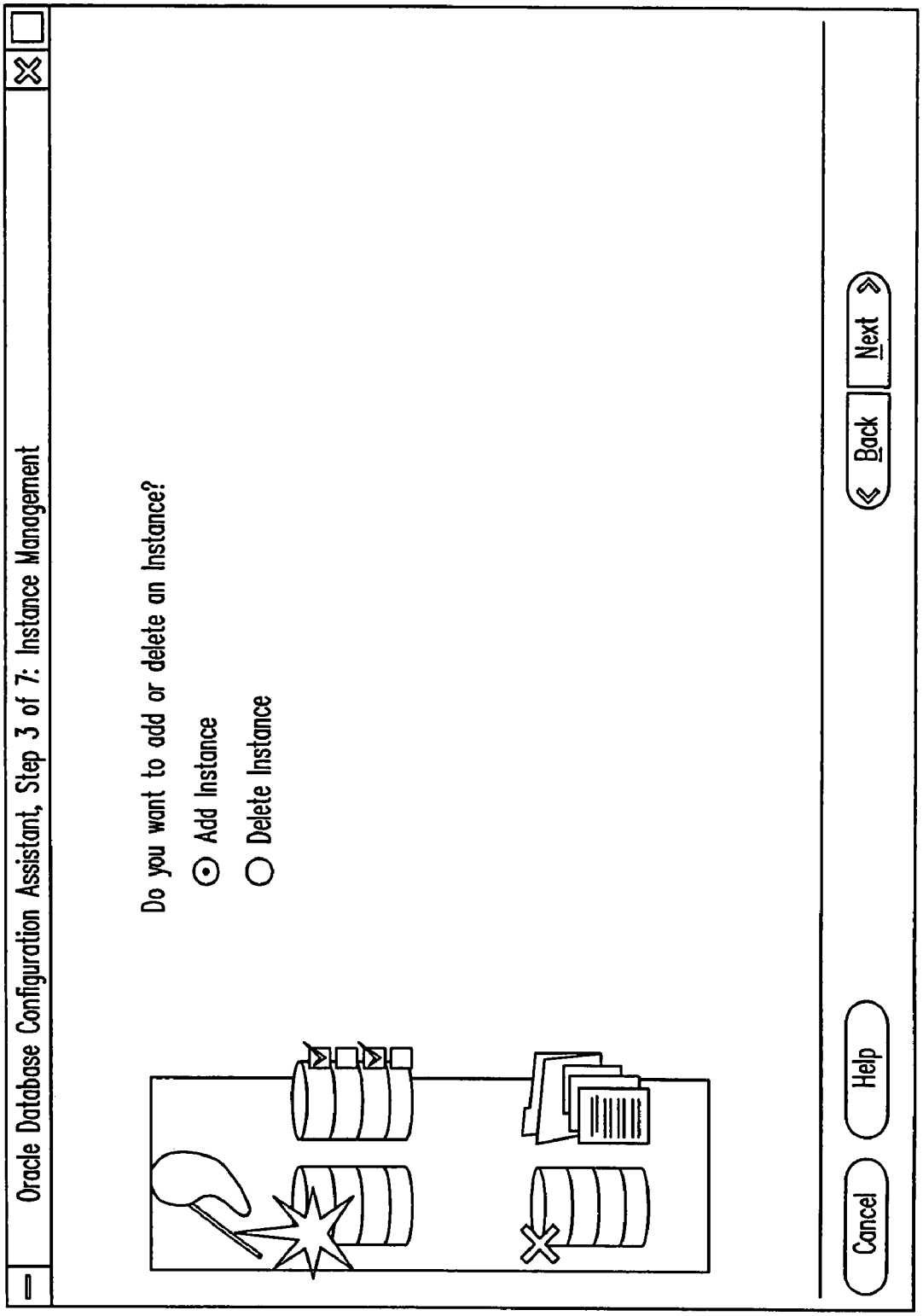

K4. After the user clicks Next, the DBCA displays the Instance Management as illustrated in FIG. 9.

Figure 10:
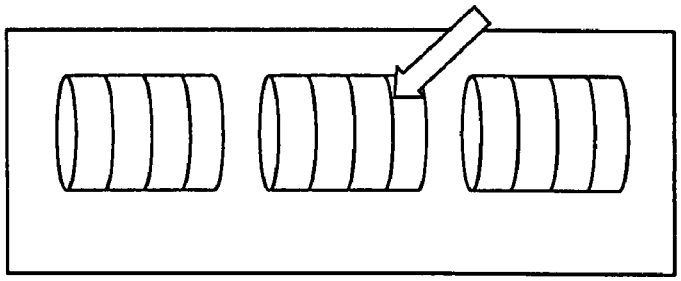

K5. After the user clicks Next, the DBCA displays the List of Databases and their current status, such as ACTIVE, or INACTIVE, as shown in FIG. 10 (which illustrates a list of databases).

Figure 11:
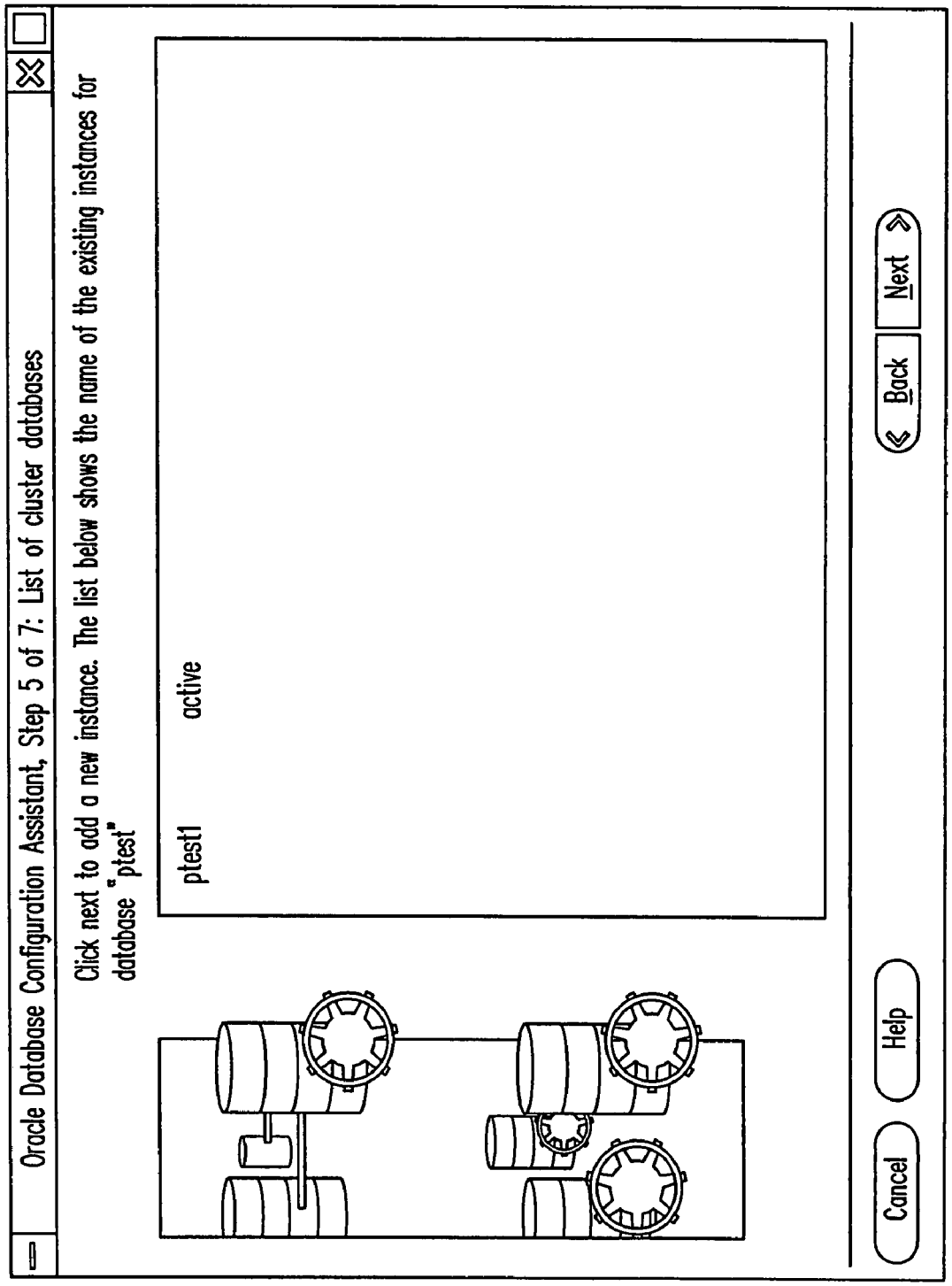

K6. The user selects an active Real Application Clusters database name to add an instance to from the List of Databases page. If the user ID is not operating-system authenticated, the DBCA also prompts for a user ID and password for a database user that has SYSDBA privileges. If prompted, the user must enter a valid user ID and password and click Next. After the user clicks Next, the DBCA displays the List of Instances Page showing the names of the instances that exist for the selected Real Application Clusters database as shown in FIG. 11 (which illustrates a list of instances).

Figure 12:
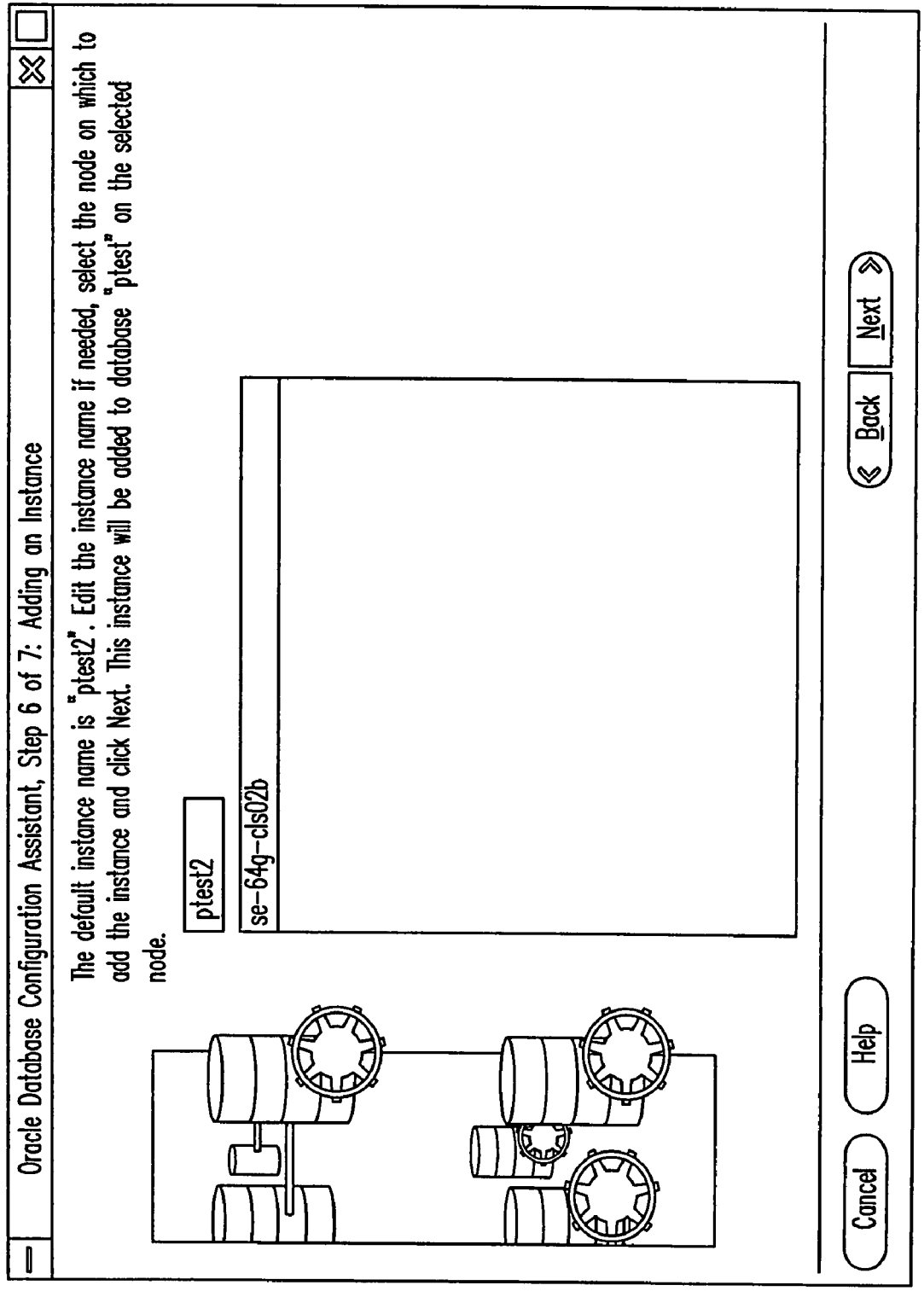

K7. After the user clicks Next, the DBCA displays the Adding an Instance page as shown in FIG. 12.

Figure 13:
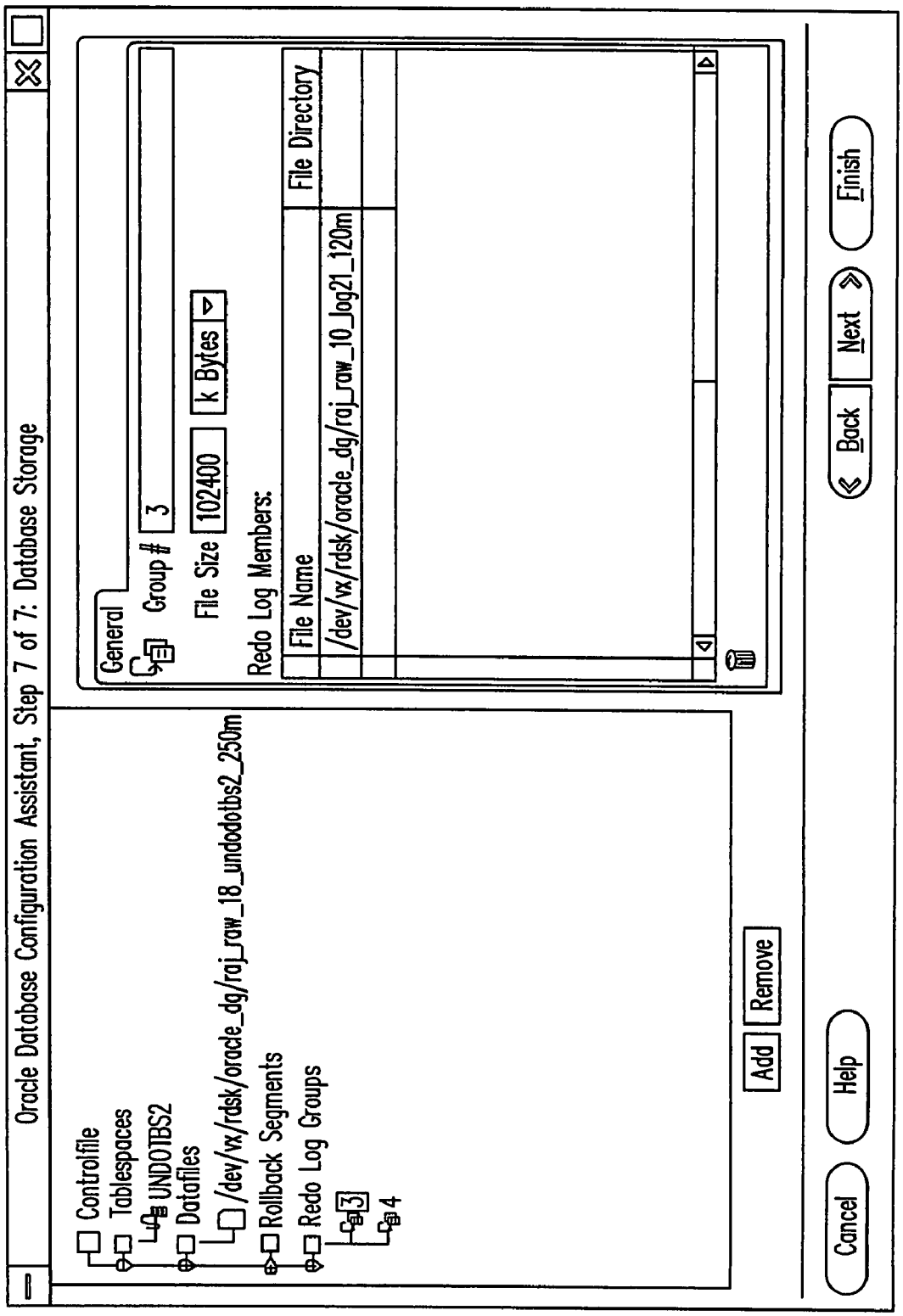

K8. The user enters the instance name in the field at the top of this page if the instance name that the DBCA provides does not match the user's existing instance name sequence. Then the user selects the new node name from the list and clicks Next. After clicking Next, the DBCA displays the Storage Page as shown in FIG. 13.

K9. If the database uses automatic undo management, and the platform supports a cluster file system, then the user can skip the rest of this act K9 unless there is a need to change the default undo tablespace data file name that the DBCA provides. Otherwise, the user selects the Tablespaces folder and expands it. The user then selects the undo tablespace storage object. Another dialog appears on the right-hand side, and the user changes the default data file name to the raw device name (or changes it to the cluster file system file name, if the user does not want to use the default name) for the tablespace.

K10. If the user's database uses rollback undo management, then the user selects the Rollback Segment folder to change the rollback segment names if the user does not want to use the default rollback segment names that the DBCA provides.

K11. If the platform supports a cluster file system, then the user skips the rest of this act K11 unless there is a need to change the default redo log group file names. Otherwise, the user selects the Redo Log Groups folder and expands it. For each redo log group number selected, the DBCA displays another dialog box. For UNIX, the user enters the raw device name that was created in the section, as described above, in the File Name field. On Windows NT or Windows 2000 the user enters the symbolic link name that was created as described above in reference to acts P1-P8.

K12. The user repeats the previous act K11 for all other redo log groups.

Figure 14:
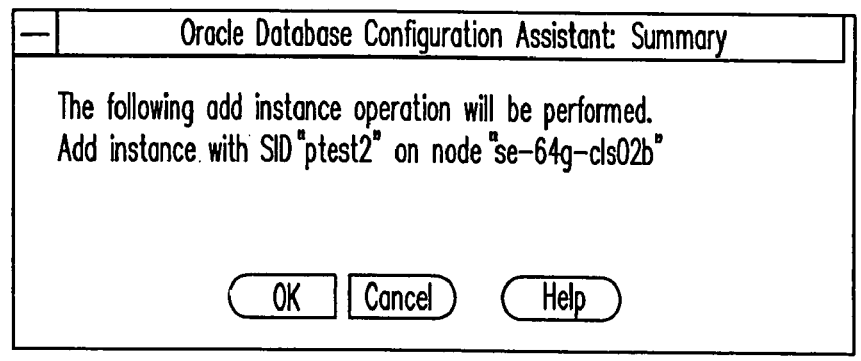

K13. Thereafter the user clicks finish. After clicking Finish, the DBCA displays a summary page, as illustrated in FIG. 14.

On the user clicking OK, the DBCA displays a progress dialog that shows the DBCA performing the instance addition operation during which the DBCA automatically adds the instance and creates the instance's Net configuration and adds listeners if needed (as described above in reference to acts A1-A15). When the DBCA completes the instance addition operation, the DBCA displays a dialog asking whether the user wants to perform another operation. The user may click No and exit the DBCA.

At this point, the user has accomplished the following: created a new database instance on the new node; created the new instance's required services for Windows NT or Windows 2000; configured Oracle Net; and started the required services for Windows NT or Windows 2000; and started the new instance and its listeners.

To delete an instance, the user may perform the following acts R1-R5.

Figure 15:
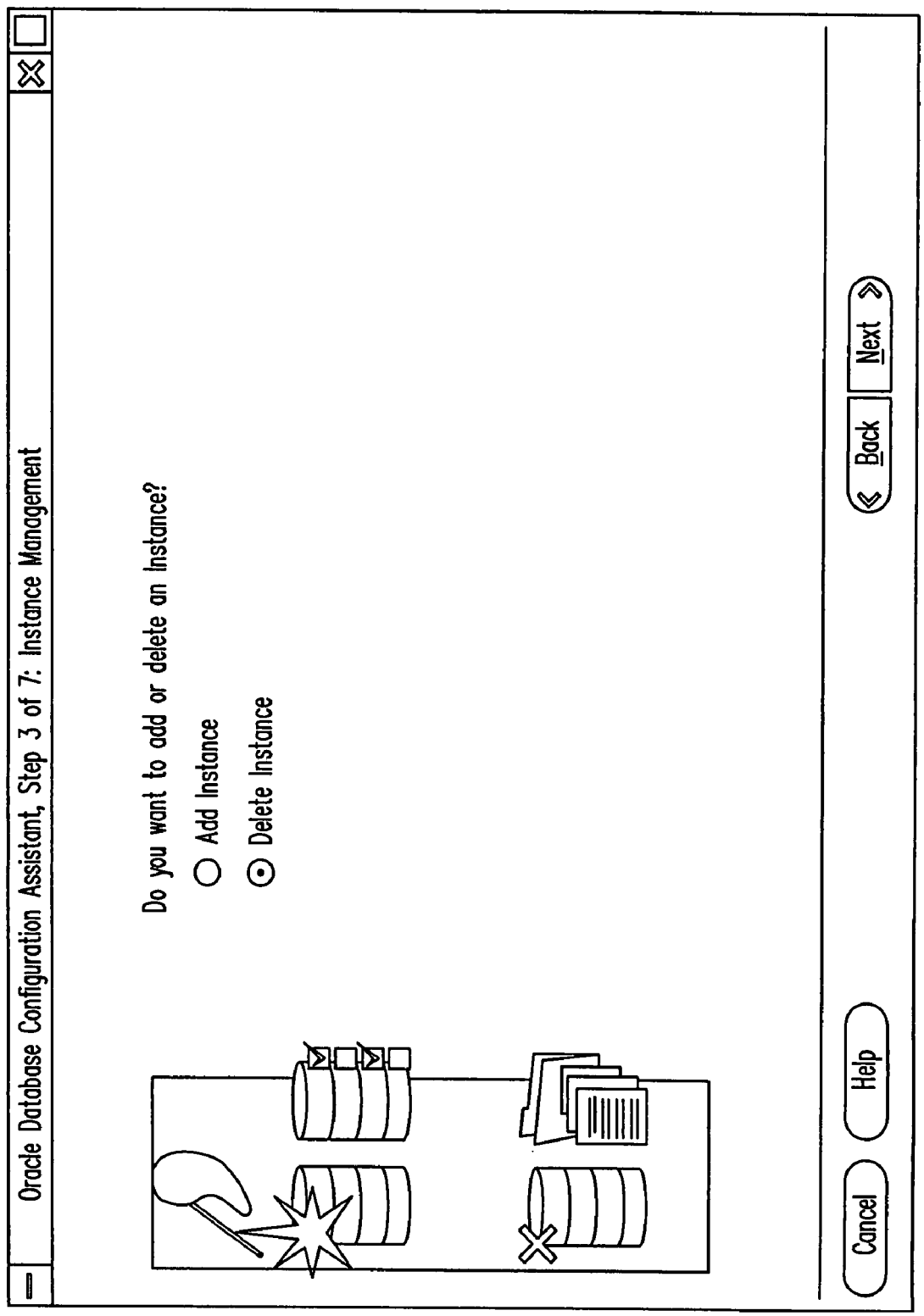

R1. The user goes to the DBCA Operations Page shown in FIG. 8, selects Instance Management and clicks Next. After the user clicks Next, the DBCA displays the Instance Management Page as illustrated in FIG. 15.

R2. The user selects the Delete Instance option and clicks Next. After the user clicks Next, the DBCA displays the List of Databases page as illustrated in FIG. 16.

Figure 17:
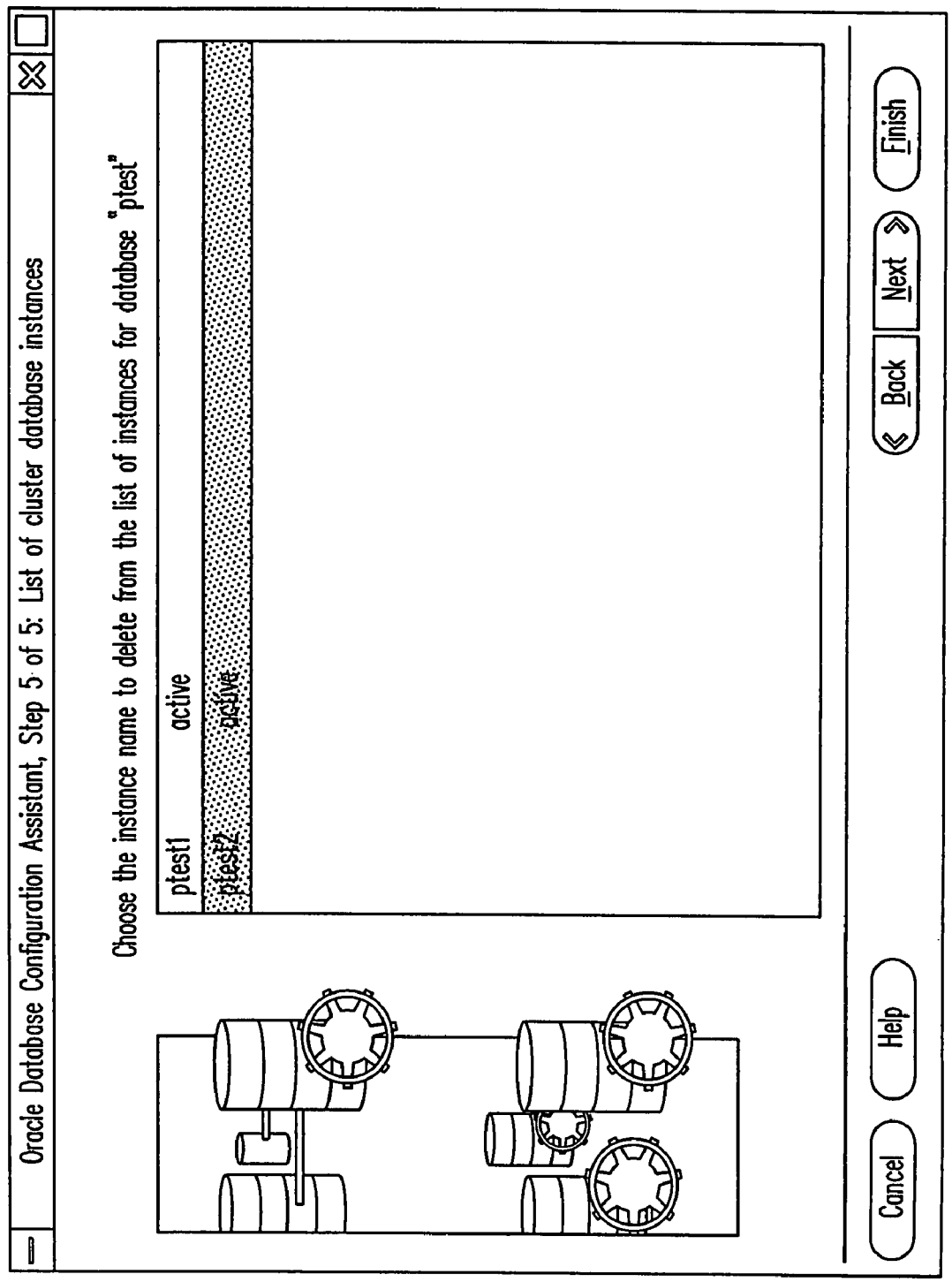

R3. The user select a database from which to delete an instance. If the user ID is not operating-system authenticated, then the DBCA also prompts for a user ID and password for a database user that has SYSDBA privileges. If the DBCA prompts for this, then the user enters a valid user ID and password and clicks Next. After the user clicks Next, the DBCA displays the List of Instances Page as illustrated in FIG. 17. The List of Instances Page shows the instances associated with the database that the user selected as well as the status of each instance.

Figure 18:
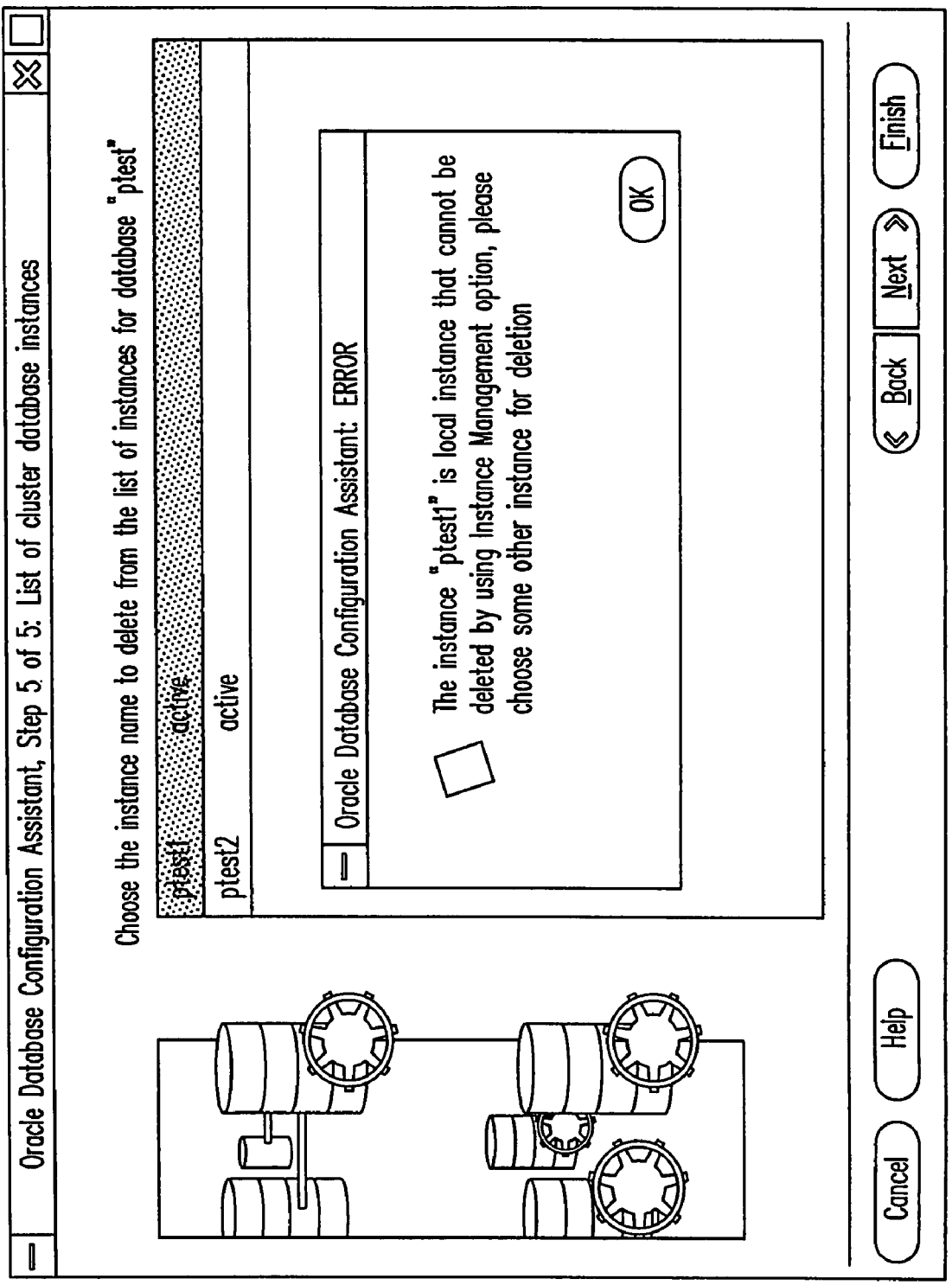

R4. The user selects the instance to be deleted and clicks Finish. If the user selects the local instance, the DBCA displays a warning as shown in FIG. 18.

Figure 19:
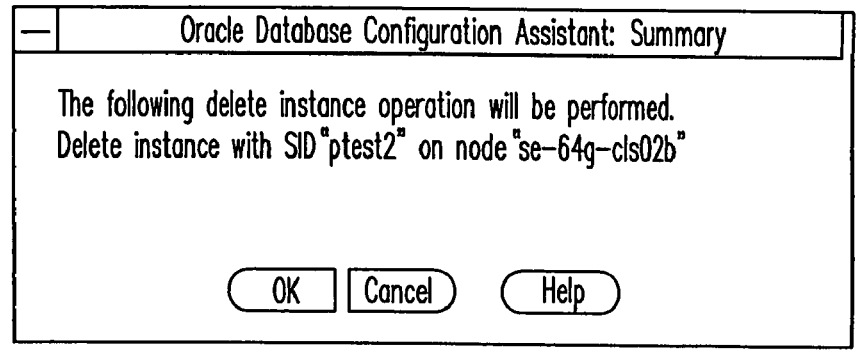

To proceed with the operation, the user clicks OK on the warning dialog and selects an instance other than the local instance and clicks Finish. The DBCA displays a summary dialog as shown in FIG. 19.

R5. The user clicks OK on the summary dialog. After clicking OK, the DBCA displays a progress dialog that shows the DBCA performing the instance deletion operation automatically during which the DBCA removes the instance and the instance's Net configuration (as described above in reference to acts D1-D13). When the DBCA completes the deletion operation, the DBCA displays a dialog asking whether the user wants to perform another operation. The user may click No and exit the DBCA.

At this point, the user has accomplished the following: stopped the listeners associated with the selected instance; deleted the selected database instance from the instance's configured node; deleted the selected instance's services for Windows NT or Windows 2000; removed the Oracle Net configuration; and deleted the Oracle Flexible Architecture directory structure from the instance's configured node.

Numerous modifications and adaptations of the embodiments described herein will be apparent to the skilled artisan in view of the disclosure. For example, Attachments A and B describe manual methods for adding an instance and deleting an instance as described herein. Accordingly, numerous such modifications of the embodiments, examples and implementations are encompassed by the attached claims.

Attachment A

Adding/Replacing A Node in an Oracle 8i (8.1.x) Parallel Server Cluster on Windows NT 4.0

This technical bulletin reviews the adding and/or replacing of nodes in an existing Oracle8i Parallel Server (8.1.x) cluster environment on NT 4.0. It provides a step-by-step set of instructions on how to set up and configure your cluster and on how to add and/or replace nodes. This technical bulletin is written for Database Administrators who have a working knowledge of Windows NT Server and the Oracle8i (8.1.x) Parallel Server database. We recommend that you contact your Oracle Database Administrator for assistance in performing the procedures in this bulletin.

1. Objectives

This technical bulletin describes a procedure for adding or replacing a node in a cluster environment for the Oracle8i Parallel Server (8.1.x). This document explains both the off-line practices for adding or replacing a node for operations that have the luxury of downtime for maintenance. It also explains the on-line practices with a minimal effect on availability for high 24×7 operations. After reading this guide and the referenced supplemental documentation, you should be able to perform:

Node replacement of a failed node to the cluster by going off-line.

Adding a node to the cluster by going off-line.

Node replacement of a failed node to the cluster without going off-line.

Adding a node to the cluster without going off-line.

2. Overview of Adding/Replacing a Node to an Oracle Parallel Server Cluster 2.1 Introduction There are two ways to accomplish adding or replacing a node to an Oracle Parallel Server cluster. The method you use depends upon your system's tolerance level of Oracle Parallel Server cluster availability. For completeness, we discuss both of the following approaches:

Off-line Incremental Solution.

On-line Over-configuration Solution.

2.1.1 Off-Line Incremental Solution

We assume that you already have an Oracle Parallel Server database running and are adding a new node to your cluster.

This approach is more intuitive and it does not make assumptions about the size of your cluster, nor does it put limits or restrictions on how large your cluster can grow. With 8.1.x-Oracle Parallel Server, we must take the system off-line during the process. If your system can tolerate momentary downtime, then we recommend this approach.

2.1.2 On-Line Over-Configuration Solution

The On-line over-configuration assumes that you have knowledge of your present as well as immediate future system requirements. It requires you to oversize/over-configure the cluster, even though your present cluster size is smaller before the Oracle Parallel Server installation goes into production.

This solution does not require you to bring down the cluster when you add the new node. However, once you configure it, it puts a limit on your cluster's size. You cannot dynamically increase the cluster size beyond the pre-configured size without bringing the Oracle Parallel Server cluster down. However, it is a workable solution for the time being.

2.1.3 Summary of the Process

You first prepare the new node to be added whether you are doing the off-line or on-line approach. Then you continue with either of the procedures to add the node(s).

3. Prepare the New Node

To prepare the new node for addition or replacement, the following steps are required. They are needed for both on-line and off-line cases.

1. Connect New Node to Cluster. If you are replacing a failed node, remove the failed device.
2. Install OSDs
3. Add OSD\IPC for Communication.
4. Install Oracle Software
5. Create OracleService<sid> Service
6. Create Password PWD<sid>.ora File
7. Add ORACLE_SID to Registry
8. Set up Initialization Files 3.1 Connect New Node to Cluster Connect the new node to the existing cluster at the hardware layer (electrical, network interconnects, and so on). Please refer to documentation by your hardware vendor on the hardware connection of the new node. We assume Microsoft's Windows NT 4.0 is installed on the new node.

3.2 Install OSDs

You must install the same OSDs that are running on your existing nodes of the cluster. You should get the OSDs from your vendor and install them using the installation mechanism the vendor provides.

For example, to install Oracle's reference OSDs, make sure you install from an account with Administrator privileges, then follow these steps:

1. Download the reference OSD kit, "OSDbin.zip" from http://ops.us.oracle.com to some temporary directory (for example, C:\temp).
2. Launch Windows NT Explorer and use it to open the OSDbin.zip file saved above (in C:\temp directory).
3. Double click on the OSDbin.zip file. The file "osd.exe" appears in the Winzip console.
4. Double click on osd.exe. An "Installing OSD binaries" window appears.
5. Click Setup and a dialog box appears.
6. If you are replacing a failed node, recall the saved Node name, Hostname, IP address, and IPC driver from the original install for the following steps.
7. Enter the node name in the Add Hostname dialog box.
8. Click Validate and Add. The hostname along with its IP address appears in the window below.
9. In the IPC Driver dialog box, select the appropriate protocol, for example, TCP.
10. Click on Install OSD Kit. By default, it installs the OSDs in a default directory, for example, C:\oracle\ref2.
11. Click OK when OSDs have been installed. Two Services, OracleCMService & OracleNMService start automatically. Check the services console to make sure they actually start up.
12. Save the Node name, Hostname, IP address, and IPC driver settings for later use.

3.3 Add OSD\IPC for Communication

After the OSDs have been installed on the new node and the OracleCMService and OracleNMService have started successfully, on the new node, follow these steps to add the OSD\IPC folder for communication with existing nodes in the cluster.

1. Start a registry editor, e.g. Start->Run->regedt32->OK
2. Click HKEY_LOCAL_MACHINE\SOFTWARE\ORACLE\OSD folder.
3. Choose Add Key from the Edit menu. A dialog box appears with the following fields:
   Key Name: enter IPC
   Class: enter REG_SZ
   Then click OK. This creates the IPC folder under OSD folder.
4. If you are replacing a failed node, recall the saved IpcHostName
5. Click IPC folder, and select Add Value from the Edit menu. A dialog box appears with the following fields:
   Value Name: enter IpcHostName
   Data Type: REG_SZ (appears automatically)
   Click OK, and the String Editor dialog box appears
   String: enter the host name for the new node
   Click OK.
6. Exit the registry editor.

3.4 Install Oracle Software

On the new node, use the Oracle8i Universal Installer to install the same version of Oracle8i version 8.1.x as installed on the existing nodes, as if it were a SINGLE NODE cluster. At the end of the installation, when OUI asks, "Do you want to create new database", select No and exit the installer.

3.5 Create OracleService<sid> Service

Once the Oracle software has been installed on the new node, use the Oracle oradim.exe utility to create an OracleService<sid> service. For example, enter the following command:
   oradim-NEW -SID ops3
   to create the service OracleServiceOPS3.
   NOTE: The SID must be unique. That is, it must be different from any existing SIDs on existing nodes.
   When you return to the command prompt, OracleService<sid> service appears in the Services Control Panel.

3.6 Create Password PWD<sid>.ora File

You need to create a pwd<sid>.ora file in %ORACLE_HOME%\DATABASE directory using Oracle orapwd.exe utility.
   e.g. cd %ORACLE_HOME%\DATABASE
   orapwd file=pwdops3.ora password=oracle

3.7 Add ORACLE_SID to Registry

To add ORACLE_SID to the registry, follow these steps:
1. Type the contents of %ORACLE_HOME%\bin\oracle.key file.
   For example, type C:\Oracle\Ora81\bin\oracle.key
   it shows: Software\ORACLE\HOME2.
2. Start a registry editor, e.g. Start->Run->regedt32->OK.
3. Go to the contents of the oracle.key file seen in step 1 above.
   For example,
   HKEY_LOCAL_MACHINE\SOFTWARE\ORACLE\HOME2
4. Click the last component of oracle.key contents, HOME2.
5. Choose Add Value from the Edit menu. A. dialog box appears with the following fields:
   Value Name: enter ORACLE_SID
   Data Type: REG_SZ (appears automatically)
   Click OK, and the String Editor dialog box appears,
   String: enter the value of ORACLE_SID, e.g. ops3
   Click OK.
   Once you have reached this point, you should be able to execute:

svrmgrl

SVRMGR> connect internal/oracle

The Oracle server should respond with:

Connected.

3.8 Set Up Initialization Files

1. Create %ORACLE_BASE%\ADMIN\<dbname> directory. Under this directory, create the adhoc, arch, bdump, create, pfile and udump sub-directories.
2. If this new node replaces an existing node, restore the initialization parameter files from the backup. Skip the rest of the steps in this section.
3. Copy init<sid>.ora and init<dbname>.ora files from one of the existing node's
   %ORACLE_BASE%\ADMIN\<dbname>\pfile directory to new node's
   %ORACLE_BASE%\ADMIN\<dbname>\pfile directory.
4. Rename init<sid>.ora file to correspond to the SID on the new node.
5. Modify init<sid>.ora file and change the rollback segment names to the ones that correspond to new node's rollback segments.
   For example, rbs1_1==>rbs3_1, rbs1_2==>rbs3_2
6. Change thread number and instance name to correspond to the new node.
   For example,
   thread=1==>thread=3
   instance_name=ops1==>instance_name=ops3

7. Create an init<sid>.ora file in %ORACLE_HOME%\database directory that contains the following line:
   IFILE=' C:\Oracle\admin\<dbname>\pfile\init<sid>.ora' assuming ORACLE_BASE=C:\Oracle
8. For 8.1.7, create an init<db>.ora file in %ORACLE_HOME%\database directory that contains the following line:
   IFILE=' C:\Oracle\admin\<dbname>\pfile\init<db>.ora' assuming ORACLE_BASE=C:\Oracle After completing these operations, the new node is ready to be added, or you are ready to replace an existing node.

4. Off-Line Incremental Solution

Here we assume that there is already a running Oracle Parallel Server cluster and we are adding a new node to it. To add a new node to an existing Oracle Parallel Server cluster, do the following:
1. Prepare the New Node
2. Shutdown Oracle Parallel Server database
3. Add New Node to Cluster at OSD Layer
4. Create Disk Partitions
5. Add or Replace New Node to Cluster at Oracle Layer For adding multiple nodes, repeat the same process for each node.

4.1 Prepare the New Node

Follow the procedure outlined in the section 3.

4.2 Shutdown Oracle Parallel Server database

Shutdown the Oracle Parallel Server database on all nodes in the cluster.

4.3 Add New Node to Cluster at OSD Layer 4.3.1 Update Registry Entries to Add Existing Nodes on New Node The registry entries on new node need to be updated with the information of the existing nodes in the cluster. On the new node, follow these steps:
1. Start a registry editor, e.g. Start->Run->regedt32->OK
2. Go to HKEY_LOCAL_MACHINE\SOFTWARE\ORACLE\OSD\CM.
3. Click on CM folder.
4. Double-click on DefinedNodes registry entry in the right window. A Multi-String Editor window appears with the new node name appearing automatically in the Data field.
5. Click inside the Multi-String Editor window and add the names of the existing nodes of the cluster at the beginning of the Data field list. Do this so that all nodes have a node name list in the same order as the other nodes in the cluster after registry entries in the existing nodes are updated. If you do not know the existing node names, use the registry editor on one of the existing nodes to find them.
   NOTE: Enter each node name on a separate line inside the Multi-String Editor window. Click OK and you will see the node names that you just entered appear in the registry entry in the right window.
6. Exit registry editor.
7. Stop and Start the OracleCMService & OracleNMService to pick up the registry changes.

4.3.2 Update Registry Entries on Existing Nodes

Skip this step if replacing a node.

When adding a new node, you need to update the registry entries on the existing nodes as well. This is because they should recognize the new node as part of the cluster. Start on one of the existing nodes and follow these steps.
1. Start the registry editor. Start->Run->regedt32->OK
2. Go to HKEY_LOCAL_MACHINE\SOFTWARE\ORACLE\OSD\CM.
3. Click on CM folder.
4. Double-click the Definednodes registry entry in the right window. A Multi-String Editor window appears with the current cluster member node names appearing automatically under the Data field.
5. Click inside the Multi-String Editor window and add the new node name at the end of the Data field list. Do this so that all nodes in the cluster have the node name list in the same order as the other nodes in the cluster.
   NOTE: Enter the new node name on a separate line inside the Multi-String Editor window. Click OK and you will see the new node name that you just entered. This appears in the registry entry in the right window.
6. Exit registry editor.
7. Stop and Start the OracleCMService & OracleNMService on the node to pick up the registry changes.
8. Repeat above steps for every remaining node of the current cluster.

4.4 Create Disk Partitions

You need to create at least two additional disk partitions for the redo logs for each new node instance. By default, two redo log partitions (for example, 5 MB each) are required for each new database instance. To create partitions for this setup, perform the following steps on any node in the cluster.
1. Start Disk Administrator, Start->Program->Administrative Tools->Disk Administrator.
2. Click on an unallocated part of the extended partition.
3. Choose Create from the Partition menu. A dialog box appears in which you must enter the size of the partition (for example; 5 MB).
4. Click on the newly created partition and choose Assign Drive Letter from the Tool menu.
5. Check Don't Assign Drive Letter, and then click OK.
6. Repeat steps 2-5 for the second and subsequent redo log partitions.
7. Choose Commit Changes Now from the Partition menu to save the new partition configuration information.
8. From all other nodes, un-assign the drive letter for the newly created partitions
9. Reboot all the nodes in the cluster to pick up the disk configuration changes.

4.5 Add or Replace New Node to Cluster at Oracle Layer

To add a new node to an existing Oracle Parallel Server cluster at the Oracle layer, perform these tasks:
1. Create Symbolic Links to Raw Partitions
2. Start up Database Instances on Existing Nodes
3. Create a Database Thread for New Node Instance
4. Start up Database Instance on New Node
5. Configure Net8 for Oracle Parallel Server Cluster Nodes 4.5.1 Create Symbolic Links to Raw Partitions 4.5.1.1 For Oracle Parallel Server 8.1.5

On the new node, use setlinks.exe to create links to the new partitions that you created in section 4.4, and existing cluster partitions. For example, the input file to setlinks.exe (for example, ops.tbl) for the current cluster looks like:

```
OPS_sys1      \Device\Harddisk1\Partition1
OPS_dr        \Device\Harddisk1\Partition8
OPS_rbs1      \Device\Harddisk1\Partition2
OPS_oemrep1   \Device\Harddisk1\Partition3
OPS_usr1      \Device\Harddisk1\Partition4
OPS_indx1     \Device\Harddisk1\Partition5
OPS_tmp1      \Device\Harddisk1\Partition15
OPS_ctl1      \Device\Harddisk1\Partition9
OPS_ctl2      \Device\Harddisk1\Partition10
OPS_log1_1    \Device\Harddisk1\Partition11
OPS_log1_2    \Device\Harddisk1\Partition12
OPS_log2_1    \Device\Harddisk1\Partition13
OPS_log2_2    \Device\Harddisk1\Partition14
```

Continuing on the example from section 4.4, create a new input file (for example, ops3.tbl) for setlinks.exe that looks like:

```
OPS_log3_1    \Device\Harddisk1\Partition16
OPS_log3_2    \Device\Harddisk1\Partition17
```

To setup links on the new node, execute the following commands:

```
setlinks  /f:ops.tbl
setlinks  /f:ops3.tbl
```

On all existing nodes, use setlinks.exe to create links to the the new partitions. For example:

setlinks /f:ops3.tbl on each node.

4.5.1.2 For 8.1.6 and Above

After creating the required raw partitions in the section 4.4 above, you need to create links to these partitions on the new node. These links should be recognized by the existing nodes of the cluster. In addition, the new node should recognize the existing raw partition links. To create these links, perform the following steps from the new node:
1. Create a temporary directory (for example, C:\temp)
2. Insert the CD-ROM containing Oracle8.1.6/8.1.7 software into the CD-ROM drive of the new node.
3. Copy the contents of \OPS_PREINSTALL directory to the temporary directory created above.
4. Install OracleObjService by entering the following command from the temporary directory created above.

C:\> ORACLEOBJSERVICE /INSTALL

This installs Oracle Link Manager (OLM), and it creates and starts the Oracle Object Service as an automatic startup type on the new node.
5. Run Object Link Manager from the temporary directory created above by entering the following command.

C:\>GUIOracleOBJManager

The Object Link Manager detects the existing raw partition links automatically and displays them in the GUI.
6. Recall the disk and partition numbers for the partitions created in section 4.4. Look for the disk numbers and partition numbers on the Object Link Manager GUI.
   Right-click next to the square box under the New Link column. Then type the link name for the first partition. Repeat the above step for the second and any additional partitions.
   Example: If your Oracle Parallel Server database name is "OPS" and it consists of two instances running on two nodes and you are trying to add a third node, then your above link names would look like OPS_log3_1, OPS_log3_2, and so on.
7. Choose Commit from the Options menu. This creates the new links on the current node.
8. Choose Sync Nodes from the Options menu. This makes these new links visible to the existing nodes of the cluster.
9. Finally, choose Exit from the Options menu to exit the Object Link Manager.

4.5.2 Start up Database Instances on Existing Nodes

4.5.3 Create a Database Thread for New Node Instance

From one of the existing nodes, create a new database thread and redo log files for the instance on the new node. For example:
1. Go to the command prompt on any of the existing nodes. Start->Program->Command Prompt.
2. Run the following SQL statements from SVRMGR>prompt after changing thread number, group and log file names appropriately.
   connect internal/oracle
   alter database add logfile thread 3
   group 5 '\\.\OPS_log3_1' size 5M reuse,
   group 6 '\\.\OPS_log3_2' size 5M reuse;
   alter database enable public thread 3;
   exit;

NOTE: If you had not rebooted the node from which you are trying to run these SQL statements, then you will see the following error messages:
   alter database add logfile thread
   *
   ORA-00301: error in adding log file '\\.\OPS_log_3_1'—file cannot be created
   ORA-27040: skgfrcre: create error, unable to create file.
   OS-Error: (OS 2)
   This is because the disk configuration changes have not been picked up. If you reboot the node and then try to run the above SQL statements, everything should work fine.
3. Add at least two rollback segments for the new node instance. Run the following SQL statements from SVRMGR>prompt after changing the rollback segment names appropriately.

connect internal/oracle create rollback segment rbs3_1 storage(initial 200K next 200K) tablespace RBS;

create rollback segment rbs3_2 storage(initial 200K next 200K) tablespace RBS;

exit;

NOTE: Do not bring these new rollback segments ONLINE as they will become private to the creating instance and therefore will not be seen by the new node instance.

4.5.4 Start Up Database Instance on New Node

After completing all of the preceding steps, you should be able to start up new database instance on the new node.

svrmgrl

SVRMGR>connect internal/oracle

Connected.

SVRMGR>startup

SVRMGR>select * from v$active_instances;

You should see new database instance as well as all existing database instances as a result of this query.

5. On-Line Over-Configuration Solution

The pre-requisite to use the on-line over-configuration approach is that you must first over-configure the cluster before your database goes into production.

When you need to add new nodes, you can do it online without shutting down the database. The following sections describe each of the steps for this approach.

5.1 Pre-Requisite: Over-Configure Cluster 5.1.1 Shutdown Database 5.1.2 Add Phantom Node Entries in Registry for Future Nodes Edit the registry entries on all the nodes to add the phantom node entries for the future nodes of the cluster.

To edit registry entries for adding phantom nodes to the cluster, follow these steps.
1. Start a registry editor, e.g. Start->Run->regedt32->OK
2. Go to HKEY_LOCAL_MACHINE\SOFTWARE\ORACLE\OSD\CM.
3. Click on CM folder.
4. Double-click on the DefinedNodes registry entry in the right window. A Multi-String Editor window appears with the existing cluster member node names appearing automatically under the Data field.
5. Click inside the Multi-String Editor window and add one entry for each future cluster member/node name at the end of Data field list. Do this so that all nodes in the cluster have the node name list in the same order as the other nodes in the cluster.
   NOTE: Enter each phantom node name on a separate line inside the Multi-String Editor window. Click OK and you will see the node names that you just entered appear in the registry entry in the right window.
6. Stop and Start the OracleCMService & OracleNMService on the node to pick up the registry changes.
7. Repeat the above steps above for all the nodes of the cluster.

5.1.3 Create Additional Disk Partitions for Future Nodes

Create at least two additional disk partitions for each future node instance in the cluster. The steps needed for creating disk partitions are documented in section 4.4 of the Incremental Solution.

When all partitions have been created, reboot all the nodes to pick up the disk configuration changes.

5.2 Add or Replace Node Online

To add a node to an existing over-configured Oracle Parallel Server cluster, follow these steps:
1. Prepare the New Node
2. Update Registry Entries to Add Existing Nodes on New Node
3. Add New Node to Cluster at Oracle Database Layer
4. Configure NetS for Oracle Parallel Server Cluster Nodes
   5.2.1 Prepare the New Node
   Follow the procedure outlined in section 3.
   Afterwards, start up Disk Administrator on the new node to un-assign the drive letters of the partitions created for Oracle Parallel Server. Refer to section 4.4 for more details.
   5.2.2 Update Registry Entries to Add Existing Nodes on New Node
   The registry entries on the new node need to be updated with the information of the existing nodes in the cluster. On the new node, follow these steps:
1. Start a registry editor, e.g. Start->Run->regedt32->OK
2. Go to HKEY_LOCAL_MACHINE\SOFTWARE\ORACLE\OSD\CM.
3. Click on CM folder.
4. Double-click on the DefinedNodes registry entry in the right window. A Multi-String Editor window appears with the new node name automatically under Data field.
5. Click inside the Multi-String Editor window and add the names of the existing nodes of the cluster at the beginning of the Data field list. Do this so that all nodes will have node name list in the same order as the other nodes in the cluster after registry entries on the existing nodes are updated. If you do not know the existing node names, use the registry editor on one of the existing nodes to find them.
   NOTE: Enter each node name on a separate line inside the Multi-String Editor window. Click OK and you will see the node names that you just entered. These appear in the registry entry in the right window.
6. Stop and Start the OracleCMService & OracleNMService on the new node to pick up the registry changes.
   5.2.3 Add New Node to Cluster at Oracle Database Layer
   5.2.3.1 Create Symbolic Links to Raw Partitions on New Node
   Refer to the section 4.5.1 on how to perform this task
   5.2.3.2 Create a Database Thread for New Node Instance
   Skip this if replacing a node. Refer to section 4.5.3 for information on how to perform this task.
   5.2.3.3 Start up Database Instance on New Node
   Refer to section 4.5.4 on how to perform this task.

6. Configure Net8 for Oracle Parallel Server Cluster Nodes

If you are replacing an existing node, restore the listener.ora and tnsnames.ora files from your backup.

If you are adding a new node to the Oracle Parallel Server cluster, perform the following tasks to enable the new node to be used:
1. Configure Static Service Information in LISTENER.ORA
2. Configure Net Service Entries for OEM in TNSNAMES.ORA
3. Configure a Non-Default Listener
   If your Oracle Parallel Server setup enables other networking options, please refer to the networking manuals for these configurations.

6.1 Configure Static Service Information in LISTENER.ORA

On the new node, perform the following steps:
1. On Windows NT, choose Start->Programs->Command Prompt.
2. Stop the listener:
   lsnrctl
   LSNRCTL> stop [listener_name]
3. Start the Net8 Assistant On Windows NT, choose Start->Program->Oracle—HOME_NAME->Network Administration->Net8 Assistant
4. Double-click on the Listeners folder.
5. Choose Database Services from drop down list box.
6. Click Add Database.
7. Enter the SID for the instance on the current node.
   IMPORTANT: Leave the Global Database Name and Oracle Home Directory fields empty, otherwise the Transparent Application Failover (TAF) feature of Oracle8i will be disabled.
8. Select Save Network configuration from the File menu.
9. Choose Exit from the File menu to exit the Net8 Assistant application.

10. Start the listener:

```
lsnrctl
|LSNRCTL> start [listener_name]
```

Example: The generated listener.ora file will look like # LISTENER.ORA Configuration
File:C:\oracle\ora81\network\admin\listener.ora
Generated by Oracle configuration tools.

```
LISTENER =
        (DESCRIPTION_LIST =
          (DESCRIPTION =
            (ADDRESS = (PROTOCOL = IPC)(KEY = EXTPROC))
          )
          (DESCRIPTION =
            (ADDRESS = (PROTOCOL = TCP)(HOST =
node3)(PORT = 1521))
          )
          (DESCRIPTION =
            (ADDRESS = (PROTOCOL = TCP)(HOST =
node3)(PORT = 2481))
            (PROTOCOL_STACK =
              (PRESENTATION = GIOP)
              (SESSION = RAW)
            )
          )
)
SID_LIST_LISTENER =
        (SID_LIST =
          (SID_DESC =
            (SID_NAME = PLSExtProc)
            (ORACLE_HOME = c:\oracle\ora81)
            (PROGRAM = extproc)
          )
          (SID_DESC =
            (SID_NAME = ops3)
          )
)
```

6.2 Configure Net Service Entries for OEM in TNSNAMES.ORA

You must add three net service entries to the existing tnsnames.ora file to enable the new node to be managed by OEM. You should perform the following steps from one of the existing nodes.

6.2.1 Add SID_startup Net Service Entry

To enable the new node to be managed by OEM, create a net service name, named SID_startup, for the new node's instance using SID rather than SERVICE_NAME and INSTANCE_NAME as follows:

1. In the Net8 Assistant, double-click on the Net Service Names folder in the directory tree.
2. Select Create from the Edit menu or click on "+" button to create a new net service name. The Net Service Name Wizard starts.
3. Enter a name in the new Net Service Name field, and click Next. The name should be SID_startup, for example, "OPS3_startup."
4. Select the network protocol that you want to use (this protocol must also be installed on the clients), and click Next.
5. Enter the appropriate listener address information for your chosen protocol in the fields, then click Next. (for example, for TCP/IP, enter the Host Name and the Port Number if you are not using the default port number).
   Click Oracle8 release 8.0, enter the SID in the Database SID field, for example, OPS3, and click Next.
6. Click Finish. The net service name is added to the Net Service Names folder.
7. Choose Save Network Configuration from the File menu.
8. Choose Exit from the file menu.

Example: The SID_startup entry would look like:

```
OPS3_STARTUP =
        (DESCRIPTION =
          (ADDRESS_LIST =
            (ADDRESS = (PROTOCOL = TCP)(HOST =
node3)(PORT = 1521))
          )
          (CONNECT_DATA =
            (SID = ops3)
          )
        )
```

6.2.2 Add ORACLE_SID Net Service Entry for the New Node Instance

1. On the same existing node, start the Net8 Assistant. On Windows NT, choose Start->Programs->Oracle—HOME_NAME->Network Administration->Net8 Assistant.
2. Double-click the Net Service Name folder in the directory tree.
3. Select Create from the Editor menu, or click on "+" button to create new net service name. The Net Service Wizard starts.
4. Enter a name in the new Net Service Name field, and click Next. The name should be the same as the SID of the database instance on the new node, such as OPS3.
5. Select the protocol the listener is configured to listen on (for example, TCP/IP), and click Next.
   NOTE: This protocol must be installed on the clients as well.
6. Enter the appropriate listener address information for your chosen protocol in the fields, and click Next. (For example, for TCP/IP, you need to enter Host Name and Port Number if not using default port number).
7. Click Oracle8i release 8.1, enter a service name in the Service Name field, and click Next. The service name is typically the global database name, a name composed of the database name and domain name entered during installation (for example, ops.us.oracle.com).
8. Click Finish. The net service name is added to the Net Service Names folder.
9. Click Advanced in the Service Identification dialog box. The Advanced Services Settings dialog box appears.
10. Enter the instance name in the Instance Name field, then click OK.
11. Choose Save Network Configuration from the File menu.
12. Choose Exit from the file menu.

Example: The newly created net service entry for the new node would look like:

```
OPS3 =
        (DESCRIPTION =
          (ADDRESS_LIST =
            (ADDRESS = (PROTOCOL = TCP)(HOST =
node3)(PORT = 1521))
          )
          (CONNECT_DATA =
            (SERVICE_NAME = ops.us.oracle.com)
            (INSTANCE_NAME = ops3)
          )
```

6.2.3 Update the Database Net Service Entry to Include the New Node Instance To update the database service entry to include the new node, follow these steps:

1. On the same existing node, start the Net8 Assistant. On Windows NT, choose Start->Programs->Oracle—HOME_NAME->Network Administration->Net8 Assistant.
2. Double-click on Net Services Names folder, and click the database net service entry (for example, OPS).
3. Click the "+" button on the Address Configuration panel.
4. Enter the address information for the new node. (For example, for Protocol: TCP/IP, you need to enter Host Name and Port Number.)
5. Choose Save Network Configuration from the File menu.
6. Choose Exit from the File menu. The Net8 Assistant application exits.

Example: The database net service entry will look like:

```
OPS =
    (DESCRIPTION =
        (ADDRESS_LIST =
            (SOURCE_ROUTE = OFF)
            (LOAD_BALANCE = ON)
            (FAILOVER = OFF)
            (ADDRESS = (PROTOCOL = TCP)(HOST = node1)(PORT = 1521))
            (ADDRESS = (PROTOCOL = TCP)(HOST = node2)(PORT = 1521))
            (ADDRESS = (PROTOCOL = TCP)(HOST = node3)(PORT = 1521))
        )
        (CONNECT_DATA =
            (SERVICE_NAME = ops.us.oracle.com)
        )
    )
```

Copy the updated tnsnames.ora file that was updated in the previous three steps to all the other nodes in the cluster.

6.3 Configure a Non-Default Listener

If you do not use the default TCP/IP port 1521, then configure the LOCAL_LISTENER parameter in the initialization parameter (init<sid>.ora) file on the new node.

The LOCAL_LISTENER parameter is resolved with either a net service name entry in tnsnames.ora file or with an Oracle Names Server (we only cover using the tnsnames.ora method in this document).

Configure the LOCAL_LISTENER parameter on the new node as follows in the initialization parameter file init<sid>.ora:

local_listener=listener_name_alias

A net service name entry in the tnsnames.ora file on the new node should be created for the listener address without the CONNECT_DATA portion of the connect descriptor. Since the Net8 Assistant does not allow you to configure the tnsnames.ora file without CONNECT_DATA information, we recommend that you manually modify the tnsnames.ora file.

For example, if LOCAL_LISTENER is set to LISTENER3 and LISTENER3 uses TCP/IP on port 1421, then the entry in tnsnames.ora file on the new node would look like:

listener3=(address=(protocol=tcp)(host=node3)(port=1421))

7. Manuals that are Incorporated by Reference Herein in their Entirety

1. Oracle8i Parallel Server Setup and Configuration, Release 8.1.x
2. The Net8 Administrator's Guide, Release 8.1.x
3. Oracle8i Parallel Server Administrator's Guide, Release 2 (8.1.6) for Windows NT

Attachment B

Adding a Node in an Oracle8i Parallel Server Cluster on Unix

This technical bulletin reviews the concept of adding a node in an existing Oracle8i Parallel Server (8.1.x) Unix cluster environment. It provides a step-by-step set of instructions on how to add new nodes to an existing OPS cluster.

This technical bulletin is written for database administrators who have a working knowledge of Solaris operating system and Oracle8i Parallel Server database. We recommend that you contact your Oracle database administrator for assistance in performing the procedures outlined in this bulletin.

1 Objectives

This technical bulletin describes a process for adding a new node to a Unix cluster environment running Oracle8i Parallel Server (8.1.x) database. After reading this guide and the referenced supplemental documentation, you should be able to:

☐ add a node to the OPS cluster without going off-line.

2. Adding a Node in an Oracle8i Parallel Server Availability

Application "downtime" is no longer an option in the twenty-first century. The systems, hardware, software and operations, deploying these applications need to tolerate various kinds of failures across the entire stack of components that participate in the applications execution without interruption. If a system crashes or needs an upgrade the system needs to be able to continue its business without going off-line.

Oracle8i Parallel Server is ideally suited for deploying these mission critical applications that require a high degree of data availability. Oracle8iParallel Server achieves this by providing fault tolerant access to the database with minimal effect on data availability during node failure by allowing the data files to be accessed from multiple nodes thereby providing access to the database as long as one of the nodes is operational.

In a 24×7 environment special care must be taken to insure uninterrupted service by developing a operations guide with contingency plan that address the day-to-day procedures as well as fault recovery plans. These plans should be adapted to your own environment and tested during non-critical periods to ensure that nothing has changed in the production environment.

All these procedure should be tailored with your environments details (names, ip addresses, etc.) and documented accordingly.

3 Overview of Adding a Node to Oracle Cluster

The problem we are addressing is to enhance the availability feature of Oracle Parallel Server by adding a new node to a existing Unix cluster running an OPS database without taking it off-line. We recommend performing the following steps in order to be able to add a brand new node to an existing OPS cluster. This discussion is based on assumption that there is already a Unix cluster running OPS database and we are adding a new node to it.

1. Prepare the New Node.
2. Add New Node to OPS Cluster.
3. Add New Node to Cluster at Oracle Layer.

4 Prepare the New Node

To prepare new node for adding to an existing OPS cluster, we assume that the new node is an exact clone of existing nodes in terms of vendor operating system, clusterware software etc. Please perform the following tasks in this order:

1. Connect New Node to Cluster
2. Create Disk Partitions
3. Install Oracle Software
4. Create Password orapw$ORACLE_SID File
5. Set up Initialization Files Steps needed to perform these tasks are explained in detail in the following sections.

4.1 Connect New Node to Cluster

You need to connect the new node to the existing cluster in the hardware sense (electrical connections, network interconnects, etc.). We won't cover the hardware connection details of the new node in this discussion. Please refer to your hardware vendor documentation for details.

4.2 Create Disk Partitions

As part of the pre-install requirements before installing Oracle software on a node for OPS installation, you need to create raw disk partitions. For the present situation, you need to create at least two new disk partitions (e.g. 5M each) for redo logs for the database instance to be started on the new node when it joins the existing cluster. We wouldn't cover the details on how to create raw disk partitions here. Please refer to the vendor documentation for more information.

4.3 Install Oracle Software

Use Oracle8i Universal Installer to install Oracle8i version 8.1.x software on the new node as if it were a SINGLE NODE cluster. Select the same products and options as were selected while installing on the existing nodes of the cluster. Also, install the Oracle software to the same ORACLE_HOME as on the existing nodes. When OUI asks, "Do you want to create new database", select No and exit the installer.

4.4 Create Password orapw$ORACLE_SID File

You need to create an orapw$ORACLE_SID password file in $ORACLE_HOME/dbs directory by using orapwd utility. Use the same password as on other nodes.

Example,

```
$ cd $ORACLE_HOME/dbs
$ orapwd file=orapw$ORACLE_SID password=oracle
```

4.5 Set Up Initialization Files

To set up initialization files on new node, please follow these steps:

1. Create $ORACLE_HOME/admin directory, e.g.

$ cd $ORACLE_HOME $ mkdir admin

2. Create $ORACLE_HOME/admin/<db_name> directory, e.g.

$ cd $ORACLE_HOME/admin $ mkdir op where op is the OPS database name.

3. Create adhoc, arch, bdump, create, pfile and udump sub-directories under <db_name> directory, e.g.

$ cd $ORACLE_HOME/admin/op $mkdir adhoc arch bdump create pfile udump

4. Copy the init$ORACLE_SID.ora and init<db_name>.ora files from $ORACLE_HOME/admin/<db_name>/pfile directory on one of the existing nodes to the pfile directory created above.

5. Rename the init$ORACLE_SID.ora file to correspond to the ORACLE_SID on new node, e.g.

$ mv initopl.ora initop3.ora

6. Change the rollback segment names in init$ORACLE_SID.ora file to correspond to the rollback segment names for new node instance, e.g.

change rbs1_1==>rbs3_1, rbs1_2==>rbs3_2

7. Change the thread number and instance name to the corresponding values on new node, e.g.

change thread=1==>thread=3 instance_name=op1==>instance_name=op3

8. Create init$ORACLE_SID.ora file in $ORACLE_HOME/dbs directory which contains the following line.

IFILE='/orahome/opsm/raj816/admin/test/pfile/initop3.ora' where ORACLE_HOME=/orahome/opsm/raj816 and ORACLE_SID=op3 on the current node.

5 Add New Node to OPS Cluster

To add a new node to an existing OPS cluster, you need to update the node_list and instance_list in $ORACLE_HOME/ops/<db_name>.conf file on all nodes of the cluster, including the new node. To do this, please follow these steps.

1. Go to the new node and create $ORACLE_HOME/ops directory, e.g.

$ mkdir $ORACLE_HOME/ops

2. From one of the existing nodes of the cluster, go to $ORACLE_HOME/ops directory, e.g.

$ cd $ORACLE_HOME/ops

3. Edit <db_name>.conf file, by using any available editor, e.g. $ vi op.conf, assuming <db_name>=op and make these changes.

a. Add new node number to node_list entry. The node numbers are assigned using sequence numbering scheme, which is vendor clusterware specific. For example, on Sun cluster, use the following command to get the list of currently configured nodes in the cluster.

$ /opt/SUNwcluster/bin/get_node_status | grep membership membership: 0 1 for a two node cluster. Therefore the node_list entry would look like as below.

node_list="0,1"

Since we are adding a new node to a two node existing OPS cluster, then its sequence number will be 2 and we update the above node_list as follows.

node_list="0,1,2"

b. Add instance name for the new node instance to inst_oracle_sid entry. For example, on Sun cluster, the instance name is composed of the <db_name> and (node number+1) by default.

e.g. If the current OPS has 2 instances, then inst_oracle_sid will look like as below.

inst_oracle_sid=(op1, op2)

where <db_name> is op.

Since we'll be adding a new instance on the new node whose node number was 2 to OPS database named op, we name the new instance as op3 and update the inst_oracle_sid as follows.

inst_oracle_sid=(op1, op2, op3)

4. Copy the modified <db_name>.conf file to all other nodes, including the new node, in the OPS cluster.

6 Add New Node to Cluster at Oracle Layer

To add a new node to an existing OPS cluster in the Oracle layer, please perform these tasks:

1. Create Database Thread for New Node Instance
2. Start up Database Instance on New Node
3. Configure Net8 for OPS Cluster Nodes Steps needed to perform these tasks are explained in detail in the following sections.

6.1 Create Database Thread for New Node Instance
From one of the existing nodes, create a new database thread and redo log files for the instance on new node, e.g. run the following SQL script from SVRMGR> prompt after changing thread number, group numbers, redo log file names and sizes appropriately.

connect internal/oracle alter database add logfile thread 3 group 5 '/dev/vx/rdsk/c0t1d0s4' size 5M reuse, group 6 '/dev/vx/rdsk/c0t1d0s5' size 5M reuse;

alter database enable thread 3;

exit;

Also, add at least two rollback segments for the new node instance, e.g. from one of the existing nodes, run the following SQL script from SVRMGR> prompt after changing rollback segment names, initial and next sizes appropriately.

connect internal/oracle create rollback segment rbs3_1 storage(initial 200K next 200K) tablespace RBS;

create rollback segment rbs3_2 storage(initial 200K next 200K) tablespace RBS;

exit;

6.2 Startup Database Instance on New Node
After successfully completing all of the above mentioned steps, you should be able to start up new database instance on the new node.

After making sure that ORACLE_HOME, ORACLE_SID and PATH environment variables have been set properly on the new node, do the following.

$ svrmgrl

SVRMGR>connect internal/oracle

Connected.

SVRMGR>startup

SVRMGR>select * from v$active_instances;

You should see new database instance as well as all existing database instances as output of this query.

6.3 Configure Net8 for OPS Cluster Nodes
While configuring Net8 for nodes in an OPS cluster, you need to perform the following tasks:

1. Configure Static Service Information in LISTENER.ORA
2. Configure Net Service Entries for OEM in TNSNAMES.ORA
3. Configure a Non-default Listener Steps needed to perform these tasks are explained in detail in the following sections.

6.3.1 Configure Static Service Information in LISTENER.ORA

To configure static service information in listener.ora file on the new node, follow these steps:

1. Go to the new node and start netasst from ORACLE_HOME/bin directory.
2. Double click on Local folder (or single click on + across Local folder).
3. Double click on Listeners folder (or single click on + across Listeners folder).
4. Click on LISTENER folder.
5. Choose Database Services from drop down list box.
6. Click on Add Database.
7. Enter ORACLE_SID for the instance on the current node.

NOTE: Make the Global Database Name and Oracle Home Directory fields empty to avoid disabling Oracle8i Tranparent Application Failover feature.

8. Select Save Network Configuration from File menu.
9. Choose Exit from File menu.

Example: Assume that ORACLE_HOME=/orahome/oracle. The generated listener.ora file will look like # LISTENER.ORA Configuration File:$ORACLE_HOME/network/admin/listener.ora

Generated by Oracle configuration tools.

```
LISTENER =
(DESCRIPTION_LIST =
(DESCRIPTION =
(ADDRESS = (PROTOCOL = IPC)(KEY = EXTPROC))
)
(DESCRIPTION =
(ADDRESS = (PROTOCOL = TCP)(HOST = node3)(PORT = 1521))
)
(DESCRIPTION =
```

-continued

```
(ADDRESS = (PROTOCOL = TCP)(HOST = node3)(PORT = 2481))
(PROTOCOL_STACK =
(PRESENTATION = GIOP)
(SESSION = RAW)
)
)
)
SID_LIST_LISTENER =
(SID_LIST =
(SID_DESC =
(SID_NAME = PLSExtProc)
(ORACLE_HOME = /orahome/oracle)
(PROGRAM = extproc)
)(SID_DESC =
(SID_NAME = op3)
)
)
```

6.3.2 Configure Net Service Entries for OEM in TNSNAMES.ORA

We assume the existing nodes already have a valid tnsnames.ora configured and we'll extend it to add two net service entries for enabling the new node to be managed by OEM. You should perform the following steps from one of the existing nodes of the cluster.

1. Add ORACLE_SID Net Service Entry for New Node Instance

2. Update Database Net Service Entry to Include New Node Instance.

The following subsections describe how to perform these steps in detail.

6.3.2.1 Add ORACLE_SID Net Service Entry for New Node Instance

From one of the existing nodes, perform the following steps.

1. Start netasst from $ORACLE_HOME/bin directory.

2. Double click on Net8 Configuration folder (or a single click on + across the Net8 Configuration folder).

3. Double click on Local folder (or a single click on + across the Local folder).

4. Double click on Service Naming folder (or a single click on + across the Service Naming folder).

5. Select Create from the Edit menu or click on the "+" to create new net service name. The Net Service Name Wizard starts.

6. Enter the ORACLE_SID of the database instance on new node in the Net Service Name field and click Next.

7. Select the protocol the listener is configured to listen on (e.g TCP/IP) and click Next.

8. Enter the appropriate listener address information for your chosen protocol in the fields, and click Next.

e.g. for TCP/IP, you need to enter Host Name of the new node (e.g. node3) and Port Number, if not using default port number(=1521).

9. Check the (Oracle8i) Service Name option, enter a service name in the Service Name field, and then click Next.

NOTE: The service name is typically the global database name, a name composed of db_name and domain_name init. ora parameters, (e.g. op.us.oracle.com).

10. Click Finish. The net service name is added to the Service Naming folder.

11. Click Advanced in the Service Identification dialog box. The Advanced Service Options dialog box appears.

12. Enter the instance name (e.g. op3) in the Instance Name field and click OK.

13. Choose Save Network Configuration from the File menu.

14. Choose Exit from File menu.

Example: The newly created net service entry would look like as below.

```
op3 =
 (DESCRIPTION =
 (ADDRESS_LIST =
 (ADDRESS = (PROTOCOL = TCP)(HOST = node3)(PORT = 1521))
 )
 (CONNECT_DATA =
 (SERVICE_NAME = op.us.oracle.com)
 (INSTANCE_NAME = op3)
 )
 )
```

6.3.2.2 Update Database Net Service Entry to Include New Node Instance

To update the database net service entry to include the new node instance, you should preform the following steps on the same node as the one used in the previous subsection.

1. Start netasst from $ORACLE_HOME/bin directory.

2. Double click on Net8 Configuration folder.

3. Double click on Local folder.

4. Double click on Service Naming folder.

5. Click on the database net service folder (e.g. OP).

6. Click on "+" in the Address Configuration panel.

7. Enter the address information for the new node.

e.g. for Protocol: TCP/IP, you need to enter Host Name of new node (e.g. node3) and Port Number (e.g. default 1521).

8. Choose Save Network Configuration from the File menu.

9. Choose Exit from the File menu.

Example: The database net service name entry would look like as below.

```
OP =
 (DESCRIPTION =
 (ADDRESS_LIST =
 (ADDRESS = (PROTOCOL = TCP)(HOST = node1)(PORT = 1521))
 (ADDRESS = (PROTOCOL = TCP)(HOST = node2)(PORT = 1521))
 (ADDRESS = (PROTOCOL = TCP)(HOST = node3)(PORT = 1521))
 (LOAD_BALANCE = yes)
 )
 (CONNECT_DATA =
 (SERVICE_NAME = op.us.oracle.com)
 )
 )
```

Finally, you should copy the updated tnsnames.ora file that was updated in the previous two steps to all other nodes in the cluster, including the new node.

6.3.3 Configure a Non-Default Listener

If you do not use the default TCP/IP port 1521, then you must configure the LOCAL_LISTENER parameter in the initialization parameter (init$ORACLE_SID.ora) file on the new node. The LOCAL_LISTENER parameter is resolved with either a net service name entry in tnsnames.ora file or an Oracle Names Server. We will only cover the tnsnames.ora method here.

The LOCAL_LISTENER parameter on the new node should be configured as follows in the initialization parameter file init$ORACLE_SID.ora:

local_listener=listener_name_alias

Example:

local_listener=listener_op3

A net service name entry in the tnsnames.ora file on the new node should be created for the listener address without the CONNECT_DATA portion of the connect descriptor. Since Net8 Assistant doesn't allow you to configure tnsnames.ora file without CONNECT_DATA information, we recommend that you modify the tnsnames.ora file manually.

Example:

If local_listener is set to listener_op3 and listener_op3 uses TCP/IP on port 1521, then the entry in tnsnames.ora file would look like:

listener_op3=(address=(protocol=tcp) (host=node3) (port=1521))

The invention claimed is:

1. A computer-implemented method for managing multiple instances of a database program executing in a plurality of computers connected by a network, the method comprising:
   a computer receiving a selection of a first instance of said database program to be deleted from among the multiple instances of said database program;
   if the first instance of said database program is local to the computer, displaying a message indicating that the first instance should not be deleted;
   if the first instance of said database program is a remote instance:
      shutting down the first instance of the database program, wherein said first instance comprises at least one database process to perform data processing;
      deleting connectivity between the first instance of the database program and the network, wherein said connectivity is used by the first instance of the database program prior to said shutting down; and
      deleting a database object of the first instance, said database object comprising database information specific to said first instance;
   wherein said deleting connectivity comprises deleting an entry for the first instance of said database program from at least one file.

2. The method of claim 1 wherein said act of shutting down further comprises:
   de-registering the first instance from a group defined in a cluster group service.

3. The method of claim 1 wherein said act of shutting down further comprises:
   killing said at least one database process of the first instance executing in a processor.

4. The method of claim 1 wherein:
   said at least one file is a private file.

5. The method of claim 1 wherein:
   said at least one file is a map file shared across all computers.

6. The method of claim 1 wherein said:
   at least one file is shared across all computers.

7. The method of claim 1 wherein:
   said at least one file is in a computer that described the killed instance.

8. The method of claim 1 further comprising:
   releasing resources used by the first instance of said database program.

9. A computer system comprising a plurality of computers connected by a network, and multiple instances of a database program executing in the plurality of computers, the computer system comprising:
   means for shutting down a first instance of the database program selected from among the multiple instances;
   means for checking if a predetermined condition is met by the first instance of the database program;
   means for displaying a message based on a result of checking the predetermined condition;
   means, based on said result, for deleting connectivity between the first instance of the database program and the network; and
   means for deleting a database object of the first instance.
   wherein said means for deleting connectivity comprises means for deleting an entry for the first instance of said database program from at least one file.

10. The method of claim 1 wherein:
    said shutting down, said deleting connectivity and said deleting the object are performed automatically in response to receipt of the selection to delete the first instance.

11. The computer system of claim 9 wherein said means for shutting down comprises:
    means for de-registering the first instance from a group defined in a cluster group service.

12. The computer system of claim 9 wherein said at least one file is a private file.

13. The computer system of claim 9 wherein said at least one file is shared across all computers.

14. A storage device comprising a plurality of instructions that when executed by a computer cause said computer to perform a method for managing multiple instances of a database program executing in a plurality of computers connected by a network, the instructions comprising:
    instructions to check if a predetermined condition is met by a first instance of the database program comprised among the multiple instances;
    instructions to display a message based on a result of checking the predetermined condition;
    instructions to shut down the first instance of the database, said first instance comprising at least one database process;
    instructions to delete connectivity between the first instance of the database program and the network, wherein said connectivity is used by the first instance prior to said shutting down; and
    instructions to delete a database object of the first instance, said database object comprising information specific to said first instance.
    wherein said instructions to delete connectivity comprise instructions to delete an entry for the first instance of said database program from at least one file.

15. The storage device of claim 14 further comprising:
 instructions in said first instance to use said database object and the connectivity to access a resource shared by the multiple instances prior to execution of said instructions to shut down.

16. The storage device of claim 14 wherein said instructions to shut down comprise:
 instructions to de-register the first instance from a group defined in a cluster group service.

17. The storage device of claim 14 wherein said at least one file is shared across all computers.

18. The method of claim 1 wherein:
 said computer executes a tool to perform said receiving; and
 said message indicates the first instance is not to be deleted using said tool.

19. The computer system of claim 9 wherein said means for checking checks if the first instance is the only instance of the database program in the plurality of computers.

20. The storage device of claim 14 wherein said instructions to check the predetermined condition check if the first instance is the only instance of the database program in the plurality of computers.

21. The storage device of claim 14 wherein said database object comprises an instance thread number.

* * * * *

UNITED STATES PATENT AND TRADEMARK OFFICE
CERTIFICATE OF CORRECTION

| | | |
|---|---|---|
| PATENT NO. | : 7,849,221 B2 | |
| APPLICATION NO. | : 11/711241 | |
| DATED | : December 7, 2010 | |
| INVENTOR(S) | : Raj Kumar et al. | |

It is certified that error appears in the above-identified patent and that said Letters Patent is hereby corrected as shown below:

In column 2, line 15, delete "least," and insert -- least --, therefor.

In column 7, line 29, delete "coms" and insert -- comes --, therefor.

In column 9, line 6, delete "SYSDEA" and insert -- SYSDBA --, therefor.

In column 9, line 7, after "password)" insert -- . --.

In column 10, line 18, delete "threadnum" and insert -- threadNum --, therefor.

In column 10, line 60, delete "Application." and insert -- Application --, therefor.

In column 14, line 42, delete "at" and insert -- an --, therefor.

In column 16, line 5, delete "four-steps," and insert -- four steps, --, therefor.

In column 22, line 23, delete "Ora8l" and insert -- Ora8i --, therefor.

In column 24, line 7, delete "Definednodes" and insert -- DefinedNodes --, therefor.

In column 24, line 38, delete "example;" and insert -- example, --, therefor.

In column 25, line 34, delete "the the" and insert -- the --, therefor.

In column 27, line 54, delete "NetS" and insert -- Net8 --, therefor.

In column 29, line 10, delete "ora8l" and insert -- ora8i --, therefor.

In column 29, line 32, delete "ora8l)" and insert -- ora8i) --, therefor.

Signed and Sealed this
Twenty-third Day of August, 2011

David J. Kappos
*Director of the United States Patent and Trademark Office*

CERTIFICATE OF CORRECTION (continued)
U.S. Pat. No. 7,849,221 B2

In column 34, line 61, delete "SUNwcluster" and insert -- SUNWcluster --, therefor.

In column 36, line 46, delete "Tranparent" and insert -- Transparent --, therefor.

In column 38, line 29, delete "preform" and insert -- perform --, therefor.

In column 39, line 66-67,
delete "4. The method of claim 1 wherein:
       said at least one file is a private file."
and insert -- 4. The method of claim 1 wherein said at least one file is a private file. --, therefor.

In column 40, line 1-3,
delete "5. The method of claim 1 wherein:
       said at least one file is a map file shared across all computers."
and insert -- 5. The method of claim 1 wherein said at least one file is a map file shared across all computers. --, therefor.

In column 40, line 4-5,
delete "6. The method of claim 1 wherein said:
       at least one file is shared across all computers"
and insert -- 6. The method of claim 1 wherein said at least one file is shared across all computers --, therefor.

In column 40, line 6-8,
delete "7. The method of claim 1 wherein:
       said at least one file is in a computer that described the killed instance."
and insert -- 7. The method of claim 1 wherein said at least one file is in a computer that described the killed instance. --, therefor.

In column 40, line 26, in claim 9, delete "instance." and insert -- instance; --, therefor.

In column 40, line 64, in claim 14, delete "instance." and insert -- instance; --, therefor.